US012797890B2

(12) United States Patent
Jensen et al.

(10) Patent No.: US 12,797,890 B2
(45) Date of Patent: Nov. 17, 2026

(54) COATING APPLICATOR TOOL USED WITH ROBOTIC DEVICE FOR REPAIRING LEADING EDGE DAMAGE ON A WIND TURBINE BLADE

(71) Applicant: Vestas Wind Systems A/S, Aarhus N. (DK)

(72) Inventors: Ivar J.B.K. Jensen, Homslet (DK); Aksel Petersen, Rinkøbing (DK)

(73) Assignee: Vestas Wind Systems A/S, Aarhus N. (DK)

( * ) Notice: Subject to any disclaimer, the term of this patent is extended or adjusted under 35 U.S.C. 154(b) by 190 days.

(21) Appl. No.: 18/576,814

(22) PCT Filed: Jun. 24, 2022

(86) PCT No.: PCT/DK2022/050147

§ 371 (c)(1),
(2) Date: Jan. 5, 2024

(87) PCT Pub. No.: WO2023/280362

PCT Pub. Date: Jan. 12, 2023

(65) Prior Publication Data

US 2025/0001447 A1 Jan. 2, 2025

(30) Foreign Application Priority Data

Jul. 9, 2021 (DK) ........................... PA 2021 70373

(51) Int. Cl.
*B05C 11/02* (2006.01)
*B05C 5/02* (2006.01)

(52) U.S. Cl.
CPC .......... *B05C 11/028* (2013.01); *B05C 5/0212* (2013.01); *B05C 5/027* (2013.01)

(58) Field of Classification Search
None
See application file for complete search history.

(56) References Cited

U.S. PATENT DOCUMENTS 11,014,202 B1 5/2021 Petersen et al.
2017/0239682 A1 8/2017 Muller (Continued)

FOREIGN PATENT DOCUMENTS

WO 2019068299 A1 4/2019
WO 2019068300 A1 4/2019

(Continued)

OTHER PUBLICATIONS

Danish Patent and Trademark Office, technical examination report issued in corresponding DK Application No. PA 2021 70373 dated Jan. 24, 2022.

(Continued)

*Primary Examiner* — Michael P. Rodriguez
(74) *Attorney, Agent, or Firm* — Wood, Herron & Evans, LLP

(57) ABSTRACT

An applicator tool (42) is provided for use with a robotic maintenance device (40) for 5 repairing damage (26) around a leading edge (22) of a wind turbine blade (20) on a wind turbine (10). The applicator tool (42) includes a tool frame (70) and a spatula (76) defining a flexible extrusion plate (78) that is configured to be engaged with an exterior surface (34) of the wind turbine blade (20), and a nozzle (84) that delivers a coating material (30) into a gap (112) between the extrusion plate (78) and the blade 0 (20). At least two nozzles (84) and corresponding fluid supplies may be provided to extend a working capacity of the applicator tool (42). The applicator tool (42) also includes a first chamfer arm (80) and a second chamfer arm (82) each configured to engage an outer surface (100) of the extrusion plate (78) adjacent a front edge (94) thereof to press the extrusion plate (78) against the exterior surface (34) of the blade 5 (20) at two specific engagement locations. The spatula (76) is configured to shape the coating material (30) into a shaped coating as the coating material (30) spreads in the gap (112) to thereby fill in and cover the damage (26) on the wind turbine blade (20), and the first and second chamfer arms (80, 82) are configured to limit spread of the coating material (30) beyond the two specific engagement locations 0 such that the shaped coating applied to the wind turbine blade (20) extends only between a first chamfer line (36) and a second chamfer line (38) on opposite sides of the leading edge (22). The applicator tool (42) also includes a vision system (160) configured to image the blade (20) to detect (Continued)

whether the first and second chamfer lines (36, 38) are located at expected positions to determine if any overfill or underfill condition needs corrected, as well as a repair verification scanner (180) that detects a coating layer thickness of the shaped coating to further confirm whether a repair is performed as expected.

24 Claims, 13 Drawing Sheets

(56) References Cited

U.S. PATENT DOCUMENTS

| | | | | |
|---|---|---|---|---|
| 2017/0252765 | A1* | 9/2017 | Medard | B05D 7/14 |
| 2020/0318619 | A1* | 10/2020 | Laurberg | B25J 19/00 |

FOREIGN PATENT DOCUMENTS

| | | | | |
|---|---|---|---|---|
| WO | 2020128823 A1 | 6/2020 | | |
| WO | WO-2020176839 A1 * | 9/2020 | | F03D 80/55 |
| WO | 2021121522 A1 | 6/2021 | | |
| WO | 2021121523 A1 | 6/2021 | | |
| WO | WO-2021121521 A1 * | 6/2021 | | F03D 80/50 |

OTHER PUBLICATIONS

International Searching Authority, International Search Report and Written Opinion issued in corresponding PCT Application No. PCT.DK2022/050147, dated Sep. 13, 2022.

* cited by examiner

COATING APPLICATOR TOOL USED WITH ROBOTIC DEVICE FOR REPAIRING LEADING EDGE DAMAGE ON A WIND TURBINE BLADE

TECHNICAL FIELD

This application relates generally to wind turbines, and more particularly relates to an applicator tool for use with a robotic device for repairing damage along the leading edge of a wind turbine blade without necessitating removal of the blade from the tower of the wind turbine or manual repairs by rope access technicians.

BACKGROUND

Wind turbines are used to produce electrical energy using a renewable resource and without combusting a fossil fuel. Generally, a wind turbine converts kinetic energy from the wind into electrical power. A conventional wind turbine installation includes a foundation, a tower supported by the foundation, and an energy generating unit positioned atop of the tower. The energy generating unit typically includes one or more nacelles to house several mechanical and electrical components, such as a generator, gearbox, and main bearing, and the wind turbine also includes a rotor operatively coupled to the components in the nacelle through a main shaft extending from the nacelle. Single rotor wind turbines and multi-rotor wind turbines (which may have multiple nacelles) are known, but for the sake of efficiency, the following description refers primarily to single rotor designs. The rotor, in turn, includes a central hub and a plurality of blades extending radially therefrom and configured to interact with the wind to cause rotation of the rotor. The rotor is supported on the main shaft, which is either directly or indirectly operatively coupled with the generator which is housed inside the nacelle. Consequently, as wind forces the blades to rotate, electrical energy is produced by the generator. Wind power has seen significant growth over the last few decades, with many wind turbine installations being located both on land and offshore.

As noted above, blades interact with the wind to generate mechanical rotation of the rotor, which can then be converted into electrical energy. A wind turbine blade is a complex structure that must be constructed to withstand long-term service in an abusive environment, while also maximizing lift and minimizing drag forces. The blades move at varying speeds through the ambient environment surrounding the wind turbine, but often this movement is at high speed. Consequently, the blades will typically experience erosion and damage over time in operation as a result of friction from the air as well as potential impacts from rain, particulate matter, debris, or other items in the air, especially along the leading edge that is configured to face the direction of movement through the wind. The erosion or damage along the leading edge of the blade adversely affects the aerodynamic qualities of the blade over time, resulting in lower power production for given incoming wind speeds. Such erosion and damage on the blades can be corrected by routine maintenance and repair procedures.

The blades are typically formed from a shell of layered fiber composite, aluminum, or similar material with an outer skin defined by a series of layers of coatings (polymeric elastomers, paint, etc.) surrounding and covering an outer surface of the shell. The shell encloses internal components of the blade and isolates them from the environment, including shear webs and spar caps, for example. The outer skin may be defined by several different layers of material, including at least an outermost topcoat, a second layer underneath the outermost topcoat, and a third layer underneath the second layer. Other layers are typically present underneath the third layer as well, including base materials typically made from fiber composites and the like. Damage to the blade outer skin can be categorized into several different levels of severity based on which layer the damage extends to, e.g., an erosion to the third layer would be a "category 2" level of severity, which would be higher than a cut to the second layer, which would be a "category 1" level of severity. For low levels of damage or erosion, such damage can be repaired by depositing a coating onto the area to fill in the damage and restore the blade to the original condition along the leading edge thereof. One such repair by depositing material can be reviewed in PCT International Patent Publication No. WO2018/113875, owned by the original Applicant of the present application.

Although the '875 Publication referenced above provides one automated device for maintenance and repair, these types of repairs of the wind turbine blades have typically been conducted in three other manners conventionally. First, the blade can be disassembled from the remainder of the wind turbine and lowered to the ground for the repair to be completed. Such a repair process is time-consuming and costly as a result of needing to disassemble, move, and reassemble the blade relative to the top of the tower. Second, a human operator with rope access can rappel along the wind turbine blade while still attached to the rotor hub to evaluate and make repairs as needed to the blade. Once again, such a repair process is time-consuming and costly because of the need for experienced rope access technicians and the time needed to effect the repairs manually. Third, a repair action can be taken by an operator on a platform hoisted into position adjacent the blade on the wind turbine, either extending from the nacelle or hub of the wind turbine or extending from a cherry picker or boom-style lift. In all conventional methods, the wind turbine must be stopped and locked for the time period of repair, and as such, significant power production losses are experienced by wind turbine operators for these necessary maintenance and repair actions. This may lead some operators to delay or procrastinate in making such repairs, which can lead to more significant structural damage and even longer delays when more thorough repairs are necessary on the wind turbine blade.

In recent years, a desire has emerged to allow for some automated or semi-autonomous maintenance of wind turbine blades, to thereby improve the speed and/or precision of such a process. However, such maintenance devices are not always designed for reliable use on a wind turbine blade still connected to the rotor and hub of a wind turbine, and such systems are very slow in operation. Furthermore, such systems may be prone to uneven or misshapen coatings that may not be precisely positioned to assure that the repair remains fully effective and bonded over a long period of time to the previous exterior surface of the blade. Thus, further improvements for maintenance and repair systems are desired.

SUMMARY

To these and other ends, embodiments of the invention are directed to an applicator tool configured to be used with a robotic maintenance device for repairing damage around a leading edge of a wind turbine blade on a wind turbine. The applicator tool includes a tool frame configured to be connected at one end of the robotic maintenance device and a spatula supported by the tool frame and configured to be engaged with an exterior surface of the wind turbine blade. The spatula includes a flexible extrusion plate having a front edge, a rear edge facing the robotic maintenance device, an outer surface and an inner surface, wherein the flexible extrusion plate is configured to define a gap between the inner surface thereof and the exterior surface of the wind turbine blade. The applicator tool further includes a first nozzle with a nozzle outlet located under the spatula to deliver a coating material into the gap as the robotic maintenance device moves the spatula along the leading edge of the wind turbine blade. The applicator tool also includes a first chamfer arm and a second chamfer arm operatively coupled to the tool frame. Each chamfer arm engages the outer surface of the extrusion plate of the spatula adjacent the front edge to press the extrusion plate against the exterior surface of the wind turbine blade at two specific engagement locations on opposing sides of the leading edge of the wind turbine blade. In this regard, the spatula is configured to shape the coating material into a shaped coating as the coating material spreads in the gap to thereby fill in and cover the damage on the wind turbine blade, and the first and second chamfer arms are configured to limit spread of the coating material beyond the two specific engagement locations such that the shaped coating applied to the wind turbine blade extends between a first chamfer line and a second chamfer line on opposite sides of the leading edge. For example, the exterior surface of the blade may be sanded or abraded by a tool to prepare for application of the coating, and the use of the first and second chamfer arms advantageously keeps the first and second chamfer lines at the edges of the shaped coating generally aligned with edges of the abrading/sanding done.

Several embodiments are now described in conjunction with the applicator tool of this invention, and it will be understood that each embodiment can stand on its own and/or be combined in any combination with the other features/steps in the following embodiments.

In one embodiment, each of the first and second chamfer arms includes a proximal end and a distal end and the applicator tool further includes first and second drive shafts extending from the tool frame so as to be coupled with the proximal ends of the first and second chamfer arms. The drive shafts are configured to pivotally move the first and second chamfer arms to adjust a position of the two specific engagement locations where the distal ends of the first and second chamfer arms engage the extrusion plate of the spatula.

In another embodiment, the applicator tool includes a gear assembly located on the tool frame and connected to the first and second drive shafts and a drive cylinder that actuates the gear assembly to synchronously rotate the first and second chamfer arms to pivot the distal ends towards or away from the spatula. In one embodiment, the drive cylinder actively applies a driving force to the gear assembly during delivery of the coating material under the spatula to maintain an engagement of the first and second chamfer arms with the extrusion plate as the spatula and the robotic maintenance device move along the leading edge of the wind turbine blade.

In yet another embodiment, the first and second chamfer arms are formed from a rigid material and the distal end of each the first and second chamfer arms further includes a pad to engage with the outer surface of the extrusion plate on the spatula. The pad is at least partially resilient to transfer forces from the first and second chamfer arms to produce the first and second chamfer lines without causing damage to the spatula or to the wind turbine blade.

In a further embodiment, the applicator tool includes a vision system with at least one imaging device configured to image the exterior surface of the wind turbine blade. In this regard, the vision system detects, based on images from the at least one imaging device, a specific location along the exterior surface where the coating terminates to define the first and second chamfer lines. The applicator tool also includes a controller operatively coupled to the vision system and to a drive element of the robotic maintenance device that can vary a supply rate of the coating material delivered to the first nozzle. The controller is programmed to determine, based on information from the vision system, whether the first and second chamfer lines of the shaped coating are located at an expected position defined by a desired size of the shaped coating. The controller is configured to send a signal to the drive element to cause the supply rate of the coating material to the nozzle be varied when the first and second chamfer lines are not located at the expected position. The vision system thereby allows the maintenance device to accurately correct for any overfill or underfill condition that may cause the first and second chamfer lines to not be in desired positions on the wind turbine blade.

In another embodiment, the vision system includes at least one illumination element configured to direct light energy onto the exterior surface of the wind turbine blade such that the at least one imaging device is configured to image the exterior surface of the wind turbine blade when illuminated by the at least one illumination element.

In another embodiment, the expected position is located at the two specific engagement locations where the first and second chamfer arms engage the outer surface of the spatula during operation of the robotic maintenance device. In still another embodiment, when the first and second chamfer lines are not located at the expected position, the controller is programmed to send a signal to the drive element to increase the supply rate of the coating material to the first nozzle, if the first and second chamfer lines are positioned closer to the leading edge than the expected position, indicative of an underfill condition. The controller is also programmed to send a signal to the drive element to decrease the supply rate of the coating material to the first nozzle, if the first and second chamfer lines are positioned farther from the leading edge than the expected position, indicative of an overfill condition.

In one embodiment, the coating material includes an ultraviolet material additive, and the at least one illumination element is configured to direct ultraviolet light energy onto the exterior surface of the wind turbine blade, such that the vision system detects where the coating terminates based on where the ultraviolet material additive stops when illuminated by the ultraviolet light energy. In yet another embodiment, the at least one illumination element is configured to direct visible spectrum light energy onto the exterior surface of the wind turbine blade, such that the vision system detects where the coating terminates based on a change in reflectivity and/or color observed when illuminated by the visible spectrum light energy.

In a further embodiment, the applicator tool includes a second nozzle adjacent the first nozzle, and a nozzle outlet located under the spatula to deliver a coating material into the gap as the robotic maintenance device moves the spatula along the leading edge of the wind turbine blade. The first and second nozzles are configured for independent connection to respective first and second coating material supply containers, such that the applicator tool applies coating material from the first nozzle until the first coating material supply container is about to be exhausted, at which point the applicator tool begins applying coating material from the second nozzle to thereby maintain a consistent supply rate of the coating material to the spatula. In another embodiment, the applicator tool includes at least three nozzles and the robotic maintenance device includes a coating material supply container for each nozzle. The coating material supply containers are independently connected to a respective one of said at least three nozzles to increase a total amount of coating material applied and/or a total length of the leading edge of the wind turbine blade that can be repaired by the robotic maintenance device. In one embodiment, each of the coating material supply containers is configured to be supported in a shared revolver or storage rack located on a main chassis of the robotic maintenance device, and separate feed hoses are connected between each nozzle at the applicator tool and a corresponding one of the coating material supply containers. In yet another embodiment, the nozzle outlets of each of the nozzles are arranged in side-by-side relationship under the spatula to feed coating material into the gap.

In a further embodiment, the applicator tool includes a repair verification scanner. The repair verification scanner includes a first scanning element and a second scanning element, each of which is configured to detect a profile height of the leading edge of the wind turbine blade defined by a spacing between the leading edge and the corresponding first or second scanning element. The first scanning element is positioned upstream from the spatula to scan the leading edge before the shaped coating is applied, and the second scanning element is positioned downstream from the spatula to scan the leading edge after the shaped coating is applied, thereby to determine a coating layer thickness of the shaped coating applied to the wind turbine blade. The coating layer thickness being a difference between the spacings detected by the first and second scanning elements. In one embodiment, the first and second scanning elements each includes an infrared sensor. In another embodiment, the first and second scanning elements perform continuous line scans of the profile height of the leading edge such that the coating layer thickness is detected over an entire working length where the applicator tool applies the shaped coating to repair damages on the wind turbine blade. The repair verification scanner allows for another verification or check to be provided to confirm the quality and accuracy of repair actions done by the applicator tool.

One embodiment of the invention is directed to a robotic maintenance device for repairing damage around a leading edge of a wind turbine blade on a wind turbine. The robotic maintenance device includes an applicator tool of any previous embodiment and a sander configured to sand the exterior surface around the leading edge of the wind turbine blade at the damage before the coating material is applied. The first and second chamfer arms are adjusted to position the first and second chamfer lines of the shaped coating proximate edges of where the exterior surface has been sanded.

Embodiments of the present invention are also directed to a method for repairing damage around a leading edge of a wind turbine blade on a wind turbine. The method includes providing a robotic maintenance device onto the wind turbine blade, the robotic maintenance device including an applicator tool having a spatula, a first nozzle, and a first chamfer arm and a second chamfer arm located adjacent the spatula. The method includes moving the robotic maintenance device along a working length at the leading edge of the wind turbine blade and discharging a coating material from the first nozzle under the spatula and specifically into a gap defined between an extrusion plate of the spatula and an exterior surface of the wind turbine blade. The method further includes shaping the coating material into a shaped coating with the extrusion plate of the spatula as the coating material spreads in the gap and as the spatula moves along the working length such that the shaped coating fills in and covers the damage on the wind turbine blade. The method also includes engaging the first and second chamfer arms with the spatula to press the extrusion plate against the exterior surface of the wind turbine blade at two specific engagement locations on opposing sides of the leading edge of the wind turbine blade to thereby limit the spread of the coating material beyond the two specific engagement locations such that the shaped coating applied to the wind turbine blade extends between a first chamfer line and a second chamfer line on opposite sides of the leading edge.

In one embodiment, the applicator tool further includes a vision system with at least one imaging device. In this embodiment, the method further includes, imaging the exterior surface of the wind turbine blade following repair actions performed by the applicator tool with the at least one imaging device and detecting, based on images from the at least one imaging device, a specific location along the exterior surface where the coating material terminates to define the first and second chamfer lines. The method also includes comparing the specific location of the first and second chamfer lines to an expected position defined by a desired size of the shaped coating and varying a supply rate of the coating material to the nozzle when the first and second chamfer lines are not located at the expected position to thereby change the specific location of the first and second chamfer lines to correct for any underfill or overfill condition at the shaped coating.

In another embodiment, the vision system includes at least one illumination element and the method includes directing light energy with the at least one illumination element onto the exterior surface of the wind turbine blade following repair actions performed by the applicator tool. The method also includes imaging the exterior surface of the wind turbine blade with the at least one imaging device when illuminated by the at least one illumination element.

In another embodiment, the applicator tool further includes at least two nozzles and the robotic maintenance device further includes a coating material supply container for each nozzle, said coating material supply containers independently connected to a respective one of said at least two nozzles. In this embodiment, the method further includes, applying coating material through the first nozzle from the first coating material supply container until the first coating material supply container is about to be exhausted and thereafter applying coating material through one of the at least two nozzles from the respective coating material supply containers to continue discharging the coating material under the spatula and into the gap at a consistent supply rate.

In yet another embodiment, the applicator tool further includes a repair verification scanner including a first scanning element and a second scanning element. In this embodiment, the method further includes, scanning the leading edge of the wind turbine blade with the first scanning element before repair actions are performed by the applicator tool, thereby detecting a profile height of the leading edge defined by a spacing between the leading edge and the first scanning element. The method also includes scanning the leading edge of the wind turbine blade with the second scanning element after repair actions are performed by the applicator tool, thereby detecting a profile height of the leading edge defined by a spacing between the leading edge and the second scanning element and determining a coating layer thickness of the shaped coating applied to the wind turbine blade, the coating layer thickness being a difference between the spacings detected by the first and second scanning elements.

The elements and steps described herein can be reconfigured and combined in many different combinations to achieve the desired technical effects for different styles of wind turbines and different repair systems, as may be needed in the art.

BRIEF DESCRIPTION OF THE DRAWINGS

The accompanying drawings, which are incorporated in and constitute a part of this specification, illustrate one or more embodiments of the invention and, together with a general description of the invention given above, and the detailed description given below, serve to explain the invention.

DETAILED DESCRIPTION

Figure 1:
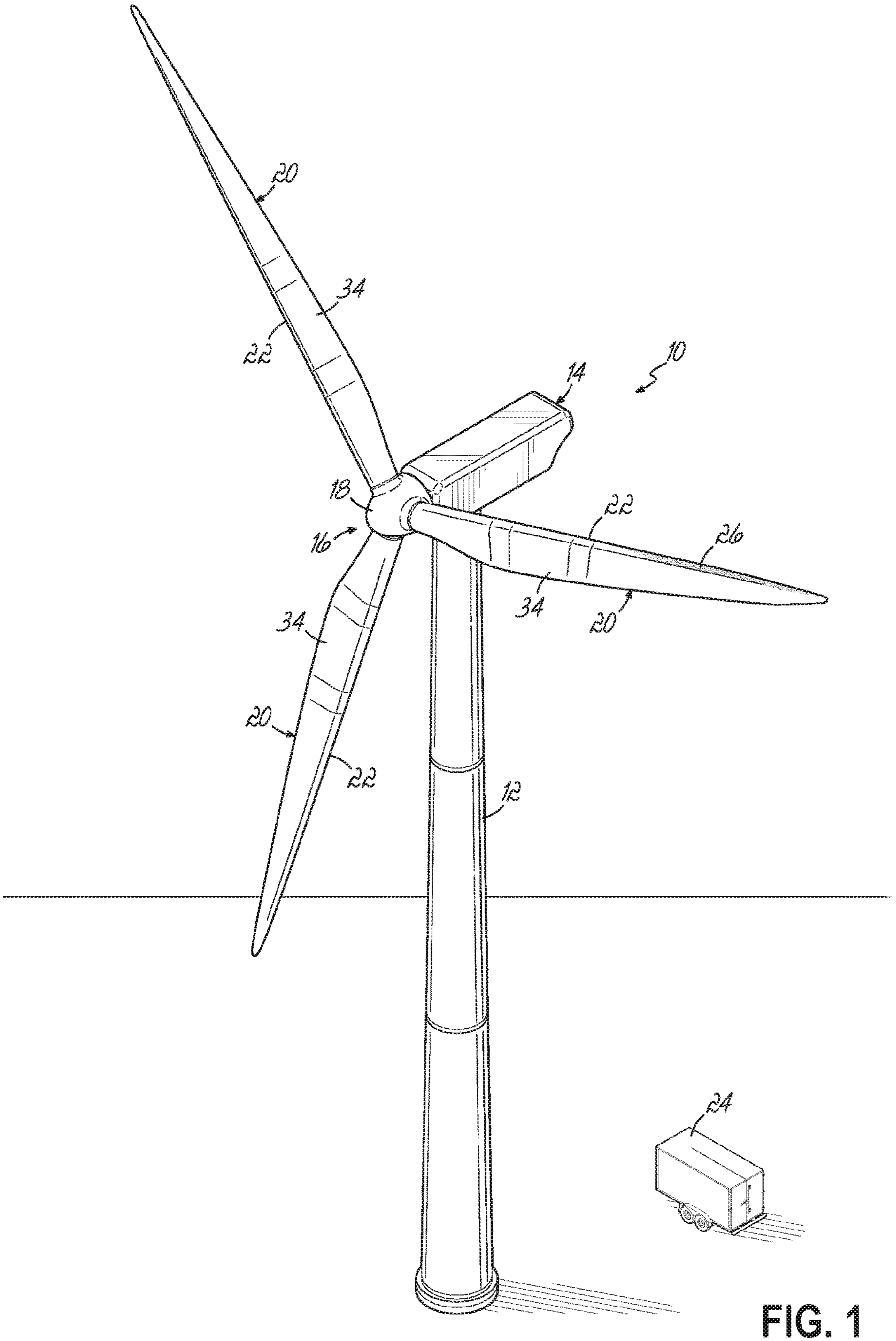
FIG. 1 is a perspective view of a wind turbine according to one embodiment of the invention.

With reference to FIGS. 1 through 10, embodiments of a coating applicator tool configured to be used with a robotic (automated or semi-autonomous) maintenance device and a method for repairing damage around a leading edge of a wind turbine blade are shown in detail. The applicator tool for repairing so-called category-1 and category-2 damage to the outer skin of a wind turbine blade includes a spatula and one or more chamfer arms for properly shaping the coating material on the leading edge of the wind turbine blade as the applicator tool is moved along the blade. As will be explained in further detail below, in one embodiment, the applicator tool also includes a vision system to detect locations where the coating material terminates along the exterior surface of the wind turbine blade, and more particularly, the location of chamfer lines formed by the chamfer arms, to thereby detect and then correct for any overfill or underfill conditions. In another embodiment, the applicator tool includes a multi-cartridge system for increased supply of coating material to the applicator tool, e.g., extending the operational range or length of the maintenance device. The applicator tool may further include a repair verification scanner to detect a profile or thickness of the coating material applied to the wind turbine blade. Each of these aspects improves the functionality and operations of the robotic maintenance device, and each will be described in additional detail below.

To repair damage around a leading edge of a wind turbine blade, the spatula and one or more chamfer arms are configured to apply a generally uniform coating of material that in cross section is typically thickest adjacent the leading edge of the blade and then decreases in thickness in a generally continuous and smooth manner along the upper and lower surfaces of the blade and in a direction toward a trailing edge of the blade. In this way, the coating may smoothly merge with the existing blade surfaces at locations away from the leading edge. Localized variations in coating thickness will occur where damage to be filled/fixed is deeper into the surface of the blade, but the outer profile of the coating following the shaping should be generally uniform. The shape of the coating material applied by the applicator tool is configured to adequately repair the damaged area of the blade while also minimizing aerodynamic disruptions of the air flow over the blade. Thus, a repair is achieved with minimal impact on the aerodynamic performance of the blade. A method of using the applicator tool may include scanning the blade to image the damaged area, sanding down a surface of the blade around the damaged area and cleaning the same, and then applying one or more layers of coating with the applicator tool to repair the damage. The chamfer arms on the maintenance device are specifically configured to limit flow and spread of the coating material such that the first and second chamfer lines at the edges of the shaped coating follow the edges of the region that has been sanded/abraded when preparing for the repair actions. The applicator tool and associated method thus produce a high quality and precise repair of the damaged area of the wind turbine blade that overcomes many of the drawbacks of existing repair devices and processes. Other advantages and effects of the embodiments of this invention will be evident from the following description.

Throughout this application, the correction of erosion damage on wind turbine blades is typically referred to as a "repair" of those damages. In some contexts, "damage" refers to more significant damages to the blade (perhaps beyond what is described as "category-1" and "category-2" damage herein), and so the operation of the applicator tool may be deemed a routine maintenance action that occurs before a blade is "damaged" in such contexts. In this regard, it will be understood that within the context of this application, the applicator tool is capable of providing preventative maintenance to remove wear and erosion effects before such effects cause "damage" that must be repaired on the wind turbine blade, and the applicator tool is also capable of providing more thorough repairs after damage is caused on the blade.

Turning with reference to FIG. 1, a wind turbine 10 is shown and includes a tower 12, a nacelle 14 disposed at the apex of the tower 12, and a rotor 16 operatively coupled to a generator (not shown) housed inside the nacelle 14. The rotor 16 of the wind turbine 10 includes a central hub 18 and a plurality of wind turbine blades 20 that project outwardly from the central hub 18 at locations circumferentially distributed around the hub 18. As shown, the rotor 16 includes three wind turbine blades 20, but the number of blades 20 may vary from one wind turbine to another. The wind turbine blades 20 are configured to interact with air flow to produce lift that causes the rotor 16 to spin generally within a plane defined by the wind turbine blades 20. As the rotor 16 spins, the wind turbine blades 20 pass through the air with a leading edge 22 leading the respective wind turbine blade 20 during rotation. The wind turbine blades 20 in use are spaced apart from the ground surface by a significant distance, which normally renders maintenance and repair actions difficult. However, the coating applicator tool in accordance with embodiments disclosed herein improves the repair process to make automated or semi-automated repairs with the robotic maintenance device more efficient and less time-consuming as will be set forth in detail below.

With continued reference to FIG. 1, a transport trailer 24 for storing and transporting the robotic maintenance device is shown. The transport trailer 24 may be towed by a motorized vehicle (not shown) to transport the robotic maintenance device to the site where the wind turbine 10 requiring blade 20 repair is located. The robotic maintenance device may be unloaded from the transport trailer 24 and lifted into position on the leading edge 22 of the wind turbine blade 20 using a boom crane or flying vehicle, such as an unmanned aerial vehicle (UAV), for example. In other embodiments, the robotic maintenance device may be stored in a container within range of the wind turbine 10 and then transported to the wind turbine 10 (such as by the aforementioned UAV) whenever a repair action is necessary.

As the wind turbine 10 ages, one or more of the wind turbine blades 20 may experience erosion from prolonged, continuous exposure to the environment. One example of such erosion damage 26 is shown in FIG. 1 and better shown in the detailed view of FIG. 2. While not being particularly limited to any source, erosion damage 26 may occur due to particulates in the air that abrade the leading edge 22 of the wind turbine blade 20 during operation. Erosion therefore may occur in an erosion zone that includes the leading edge 22, but it may also occur in other areas in the surface of the blade 20. Accordingly, while the robotic maintenance device is configured to repair damage with the applicator tool and move along the leading edge 22 of the blade 20, this device may also be capable of conducting maintenance and repair actions elsewhere along the outer surface of the blades 20.

Figure 2:
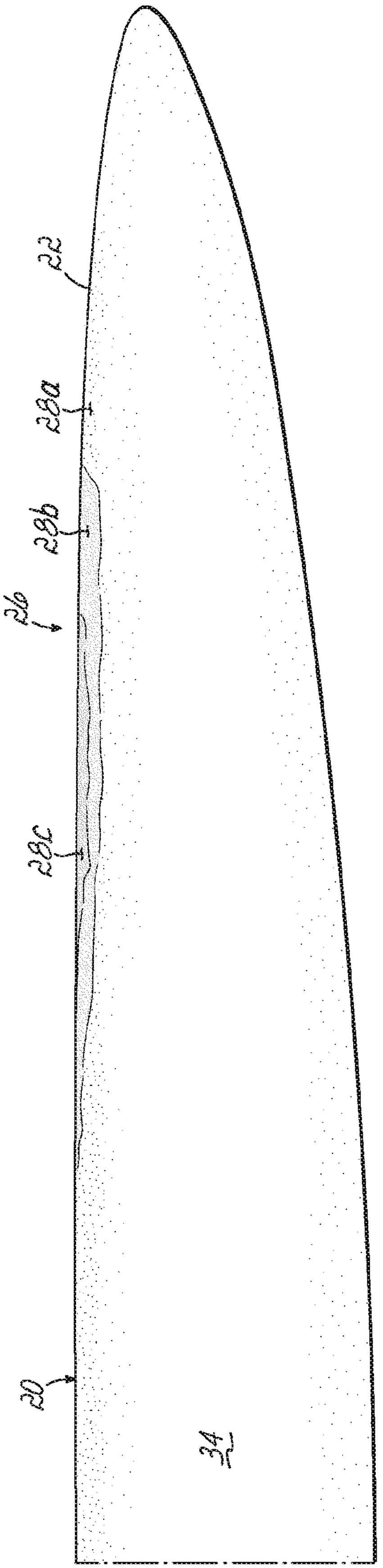
FIG. 2 is a front view of a wind turbine blade of the wind turbine of FIG. 1 showing various levels of erosion-type damage along a leading edge that is pitched upwardly.

Erosion damage 26 is generally characterized as a loss of material from the wind turbine blade 20. Material loss may be uniformly distributed but is often non-uniform across the leading edge 22 or any other surface of the wind turbine blade 20. Rather than losing a uniform skin of material from a surface, erosion may include localized surface imperfections, such as random pitting and shallow gouges or crack-like features that may be a result of localized, connected pitting (as a result of impacts with debris or other matter in the environment). In any case, if erosion damage 26 is not repaired in a timely fashion, the wind turbine blade 20 may become less efficient at rotating the rotor 16 and, ultimately, the structural integrity of the wind turbine blade 20 may be significantly impaired. With reference to the detailed view of in FIG. 2, it will be understood that the erosion damage 26 may define differing levels of severity based on how deep the damage 26 extends inwardly into the material layers defining the outer shell of the blade 20. In the example shown, the erosion damage 26 includes some areas with an erosion or cut of material through the outer topcoat layer into a second layer of material underneath the topcoat, which is categorized as a "category 1" level of severity, and further areas with an erosion or cut of material through the outer topcoat layer and the second later of material into a third layer of material underneath the second layer, which is categorized as a "category 2" level of severity. For reference, deeper cuts and erosions defining more significant damage is typically categorized at higher levels such as category 3, 4, or 5. In FIG. 2, the topcoat is shown at **28*a*, the revealed areas of second layer are shown at 28*b*, and the revealed areas of third layer are shown at 28*c*. By identifying and correcting such lower levels of erosion damage 26 promptly by maintenance-style "repair actions," more significant damage of the blade 20** can be avoided along with higher operational downtime caused by the more significant damage.

Figure 3:
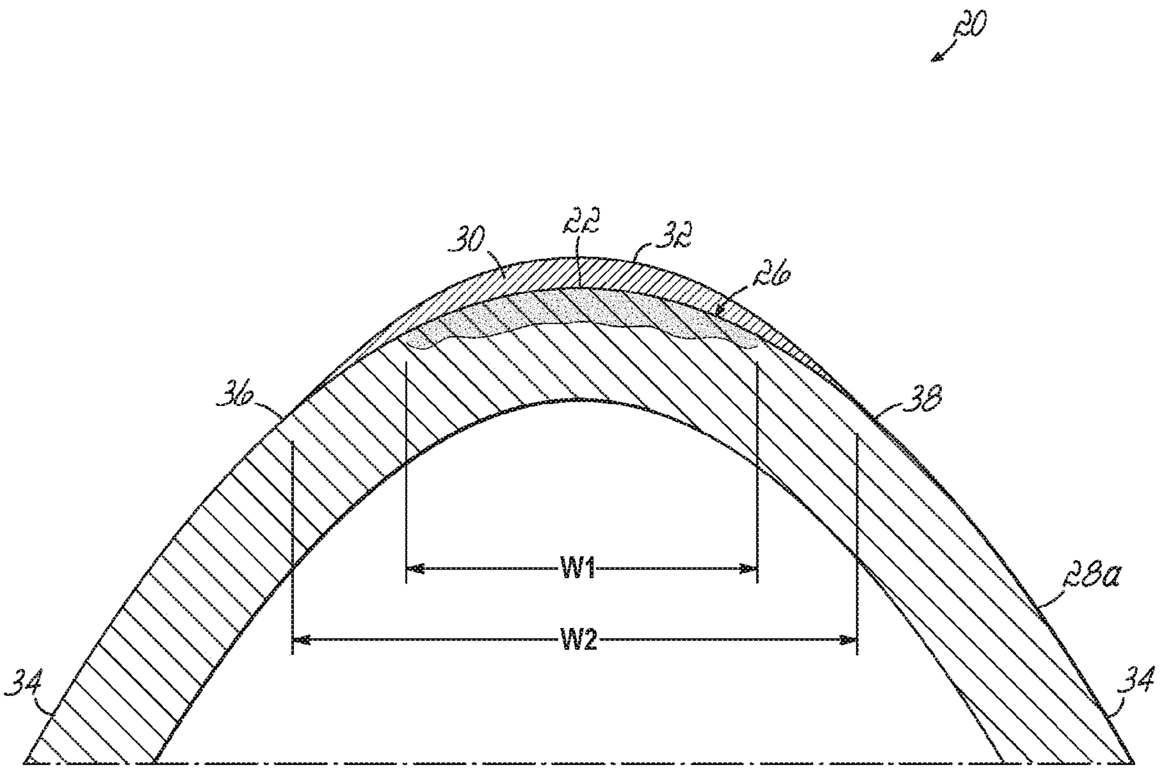
FIG. 3 is an enlarged cross-sectional view of the wind turbine blade shown in FIG. 2 with a coating applied over the damaged region on the leading edge of the blade.

FIG. 3 illustrates a repaired section of a wind turbine blade 20 having damage 26 on the leading edge 22 of the blade 20. The repaired section includes a shaped coating 30 of material that has been applied over the damage 26 on the leading edge 22 of the blade 20, in accordance with embodiments of this invention. The coating 30 is configured to define a new outer surface 32 that thereafter interacts with the air flowing over the blade 20 during later operations of the wind turbine 10. As such, the coating 30 corrects and covers/fills in the damage 26 on the wind turbine blade 20 and prevents or reduces the likelihood of the damage 26 further advancing, such as to a higher category of damage. As shown in the example of FIG. 3, the damage 26 may extend a width W1 across the leading edge 22 from the leeward side to the windward side of the blade 20. Similarly, the applied layer of coating 30 extends a width W2 across the leading edge from the leeward side to the windward side of the blade to cover and fill in the damage 26. Notably, the width W2 of the coating 30 is larger than the width W1 of the damage 26 to best cover up and fill in the damage 26 while also maintaining the aerodynamic profile of the leading edge 22 of the blade 20. In that regard, the coating 30 is shaped so as to minimize any negative impacts of the repair on the aerodynamic performance on the wind turbine blade 20 during use. The larger width W2 of the coating 30 allows the new outer surface 32 to merge with the original outer surface 34 to minimize disruptions of the air flow over the blade 20, as will be described in greater detail below.

With continued reference to FIG. 3, the coating 30 is thus typically configured to be at a maximum thickness at or about the leading edge 22 of the blade 20 and then decrease in thickness in a direction away from the leading edge 22 and toward the trailing edge (not shown) of the blade 20 along both of the existing outer surfaces 34 (i.e., leeward and windward sides) of the blade 20. More particularly, the thickness of the coating 30 merges with the outer surface 34 of the leeward side at a first chamfer line 36 and the windward side at a second chamfer line 38. As will be described in further detail below, the first and second chamfer lines 36, 38 extend generally parallel to and proximate the leading edge 22 of the wind turbine blade 20 and are formed by the one or more chamfer arms of the applicator tool, described in further detail below. Preferably, the thickness of the coating 30 should decay to substantially zero at the first and second chamfer lines 36, 38. This allows the coating 30 to merge into the existing surfaces 34 of the blade 20 in a smooth manner, thereby minimizing the disruption of the air flow in the transition from the outer surface 32 of the coating 30 to the original outer surfaces 34 of the blade 20.

In an exemplary embodiment, the coating 30 may be formed from an epoxy or a polyurethane, but other materials may also be possible. The applicator tool in accordance with embodiments of the invention aids in providing a precise and high-quality coating 30 on the leading edge 22 of the wind turbine blade 20 having the shape and features as described above.

Figure 4:
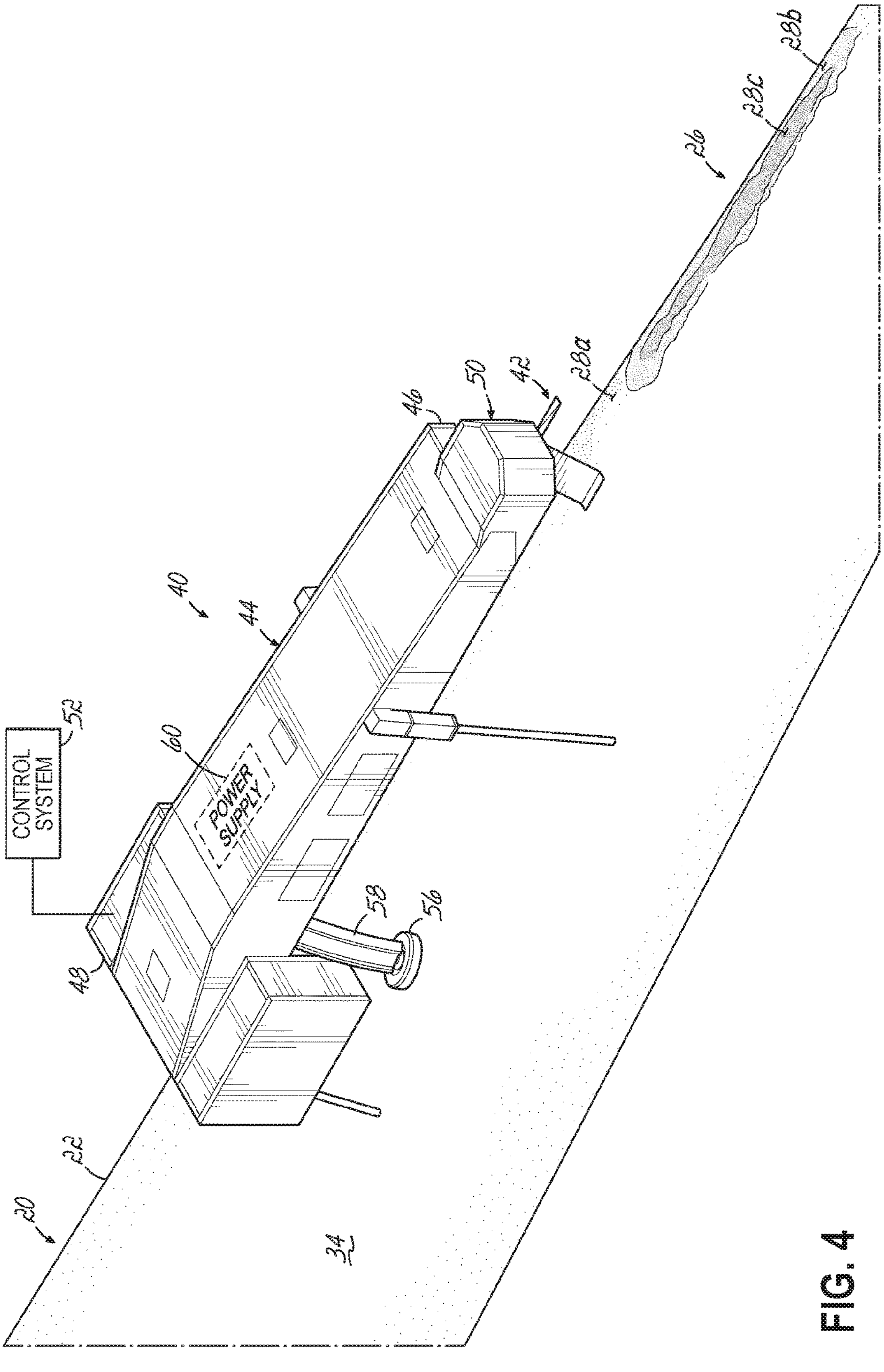
FIG. 4 is a top perspective view of a robotic maintenance device including a coating applicator tool head in accordance with embodiments of the present invention, the maintenance device being mounted in position on the leading edge of the wind turbine blade of FIGS. 1 through 3.

FIG. 4 provides an overview of an exemplary robotic maintenance device 40 equipped with an applicator tool 42 in accordance with embodiments of this invention. The maintenance device 40 includes a main body 44 (also referred to as a main chassis) that extends between a first end 46 and a second end 48. As shown, the maintenance device is configured to align with and extend along the leading edge 22 of the blade 20 when mounted on the blade 20. The first end 46 of the main body 44 includes a tool head 50 configured to support the applicator tool 42 over the leading edge 22 of the blade 20, as shown in this Figure. The applicator tool 42 is operatively coupled (e.g., mechanically and electrically) with the robotic maintenance device 40 via the tool head 50. In this regard, the tool head 50 and main body 44 of the maintenance device 40 may house components required to mechanically and electrically operate the applicator tool 42 and associated components, as will be described in further detail below. The maintenance device 40 and the tool head 50 are shown in schematic form in these views except where necessary to illustrate particular features related to the aspects of the present invention. It will be appreciated that the wind turbine 10 is halted with the blade 20 to be worked upon in a generally horizontal orientation with the blade 20 pitched so that the leading edge 22 faces upwardly such that the maintenance device 40 can then be placed upon the blade 20 as shown in this Figure. The maintenance device 40 can be moved onto the blade 20 in various manners without departing from the scope of this invention, including by crane and/or by flying vehicle. The main body 44 and tool head 50 generally defines a framework for other components of the maintenance device 40 to be mounted on, as set forth in the following description.

The maintenance device 40 also includes a control system 52 shown schematically in FIG. 4 and implemented on known hardware and software platforms. The control system 52 is operatively connected to the components of the maintenance device 40, including the applicator tool 42 and associated components, and at least a movement drive (not shown in detail) for the maintenance device 40, to thereby operate these elements. More particularly, the control system 52 is capable of responding to inputs from components of the maintenance device 40 and applicator tool 42 and/or from an offsite operator to modify or initiate the actions taken by the maintenance device 40. More particularly, the actions of the maintenance device 40 and applicator tool 42 may be modified based on real-time feedback or inputs detected by the maintenance device 40 during repair operations.

The drive system is located on the underside of the body 44 of the maintenance device 40 and is configured to engage with the leading edge 22 of the wind turbine blade 20 (or a portion of the blade 20 proximate the leading edge 22) to move the maintenance device 40 along the leading edge 22. In this regard, the drive system may include a plurality of continuous tread drives, each having a continuous tread independently driven by at least one motor. Each continuous tread may be generally U-shaped to conform to the shape of the leading edge 22 of the wind turbine blade 20. That way, the treads grip the leading edge 22 to move the maintenance device 40. The treads may be formed from rubber, plastics, or other suitable moderate to high friction material for gripping the wind turbine blade 20, for example. To this end, as the treads are driven, the maintenance device 40 is moved at a steady pace along the leading edge 22 of the wind turbine blade 20 during repair operations.

To stabilize the maintenance device 40 as it moves along the leading edge 22 during repair operations, the maintenance device 40 also includes two or more wheels 56 connected to the main body 44 of the maintenance device 40, as shown in FIG. 4. The wheels 56 are connected to an underside of the main body 44 via respective support arms 58 and steady movement of the maintenance device 40 as it moves along the wind turbine blade 20. The support arms 58 may be curved to conform to the shape of the wind turbine blade 20. The curvature of the support arms 58 results in a predictable contact point between the wheels 56 and the surfaces 34 of the wind turbine blade 20, which is preferably below the damaged area 26. The wheels 56 can freely rotate along the surface 34 of the blade 20 in response to movements of the maintenance device 40 generated by the movement drive(s). The wheels 56 help support a weight of the maintenance device 40 on the blade 20 such that the entire weight is not applied to the movement drive(s) and its elements. These wheels 56 may be formed from a plastics material or any other suitable material, typically a moderate to low-friction material to help avoid any damage upon engagement with the blade 20. The wheels 56 prevent tipping of the maintenance device 40 to either side of the blade 20. The plurality of wheels 56 in combination with the movement drive(s) are configured to space the applicator tool 42 over the leading edge 22 for repair operations. Moreover, the wheels 56 and movement drive(s) produce a steady movement of the maintenance device 40 along the blade 20 during repair and maintenance actions. To this end, it will be understood that any number of wheels 56 and movement drives may be provided in other embodiments.

Additionally, a power supply 60 such as a battery pack may be mounted on the maintenance device 40 for supplying power to components of the maintenance device 40 such as the controller 52, the drive system, and the applicator tool 42, for example. The power supply 60 may be configured to power those components and systems so that the maintenance device 40 can repair an entire leading edge 22 of a wind turbine blade 20, for example. The power supply 60 is shown schematically in FIG. 4. The power supply 60 may also be used to provide operating power to additional elements or modules that may be connected to the maintenance device 40 as well.

Further examples of robotic maintenance devices are, for example, disclosed in DK Application Nos. PA 201970789 and PA 201970790, which are owned by the same Assignee as the present invention, and such robotic maintenance devices may be used in other embodiments with the applicator tool of the present invention. Further details of any exemplary robotic maintenance device can be understood from those prior patent applications in combination with the description provided herein.

Figure 5:
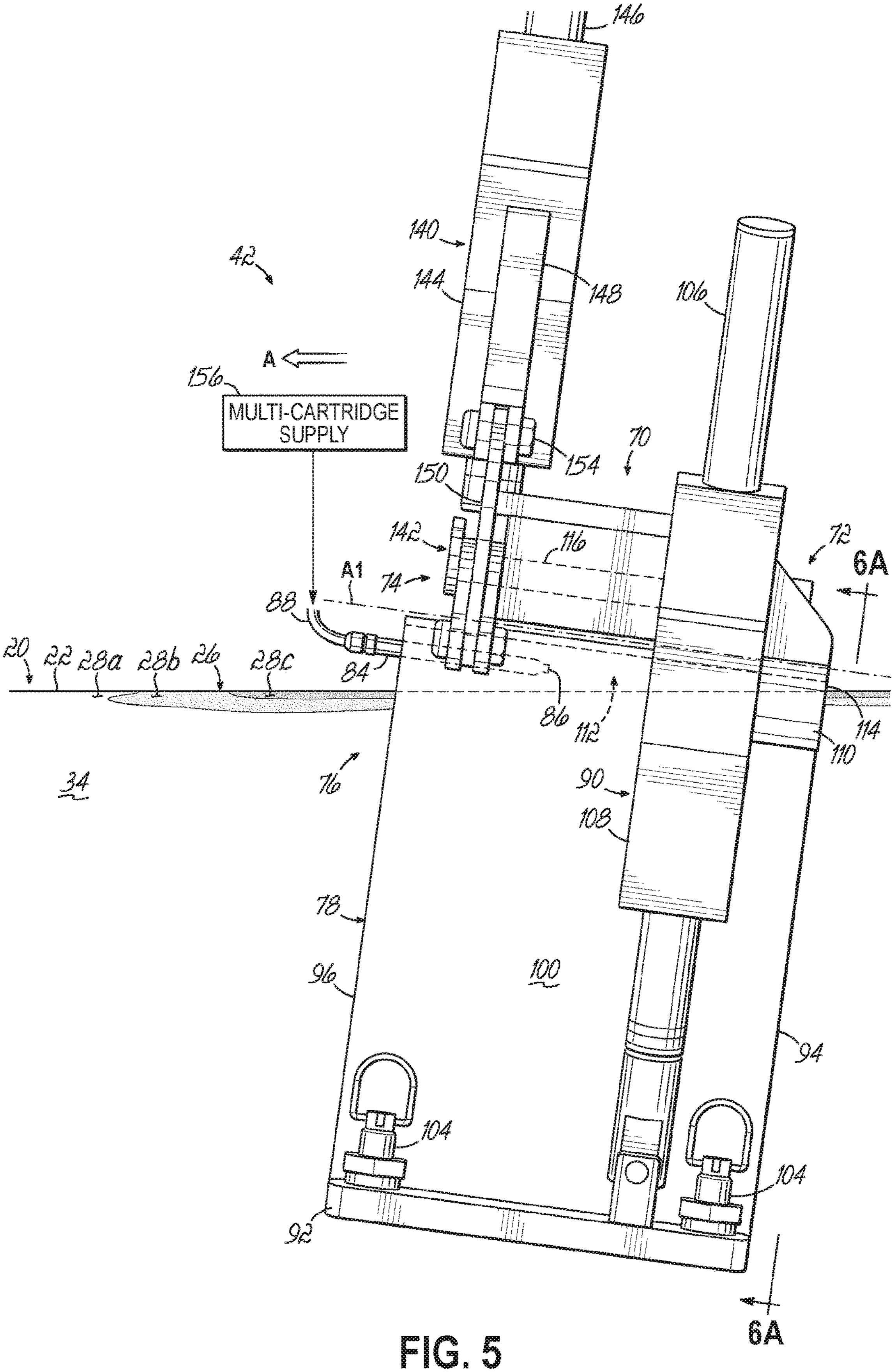
FIG. 5 is a side view of an applicator tool being used to repair damage to the leading edge of the wind turbine blade.
Figure 6A:
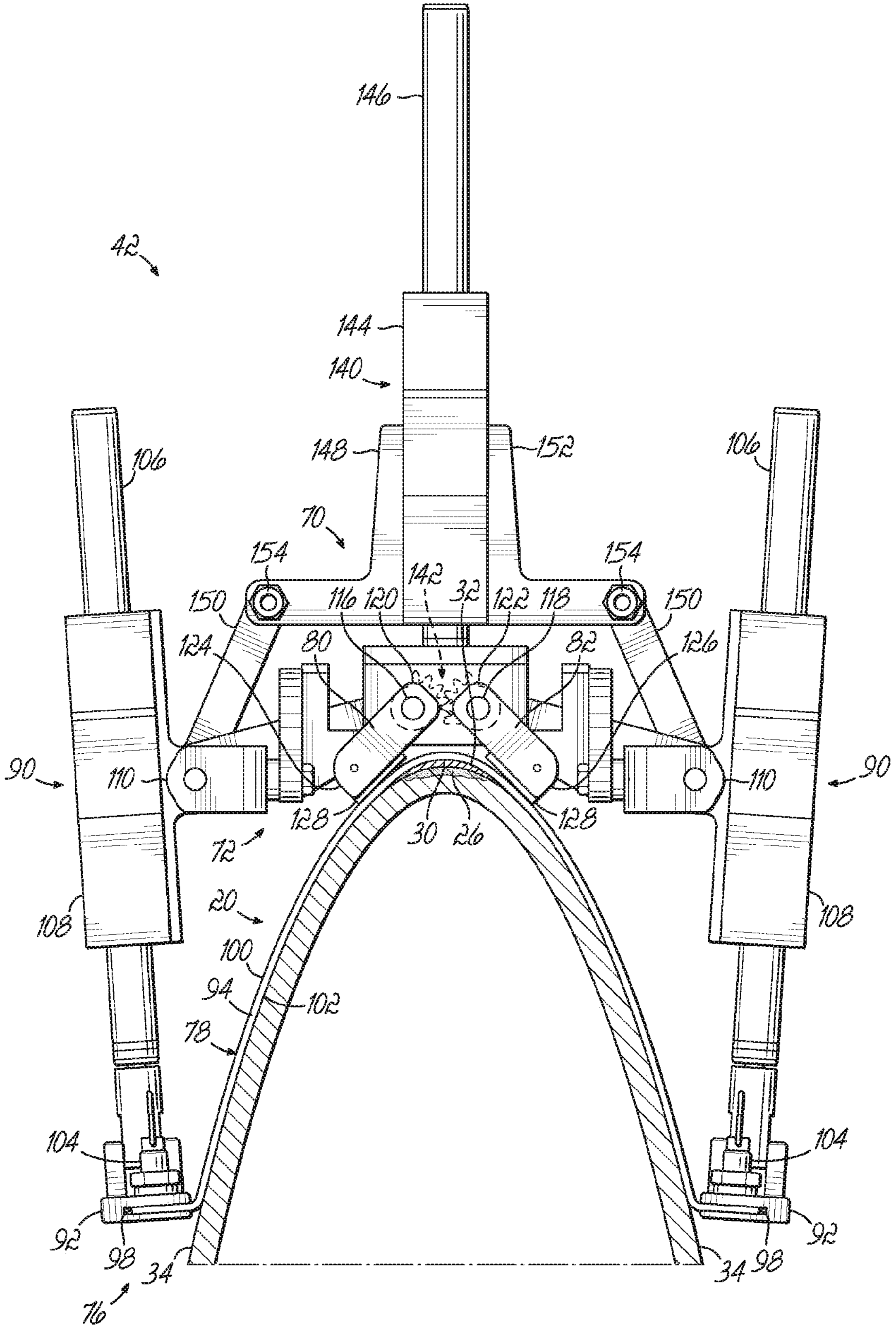
FIG. 6A is a front view of the applicator tool of FIG. 5, taken along line 6A-6A in FIG. 5, illustrating an actuated position of a first chamfer arm and a second chamfer arm.
Figure 6B:
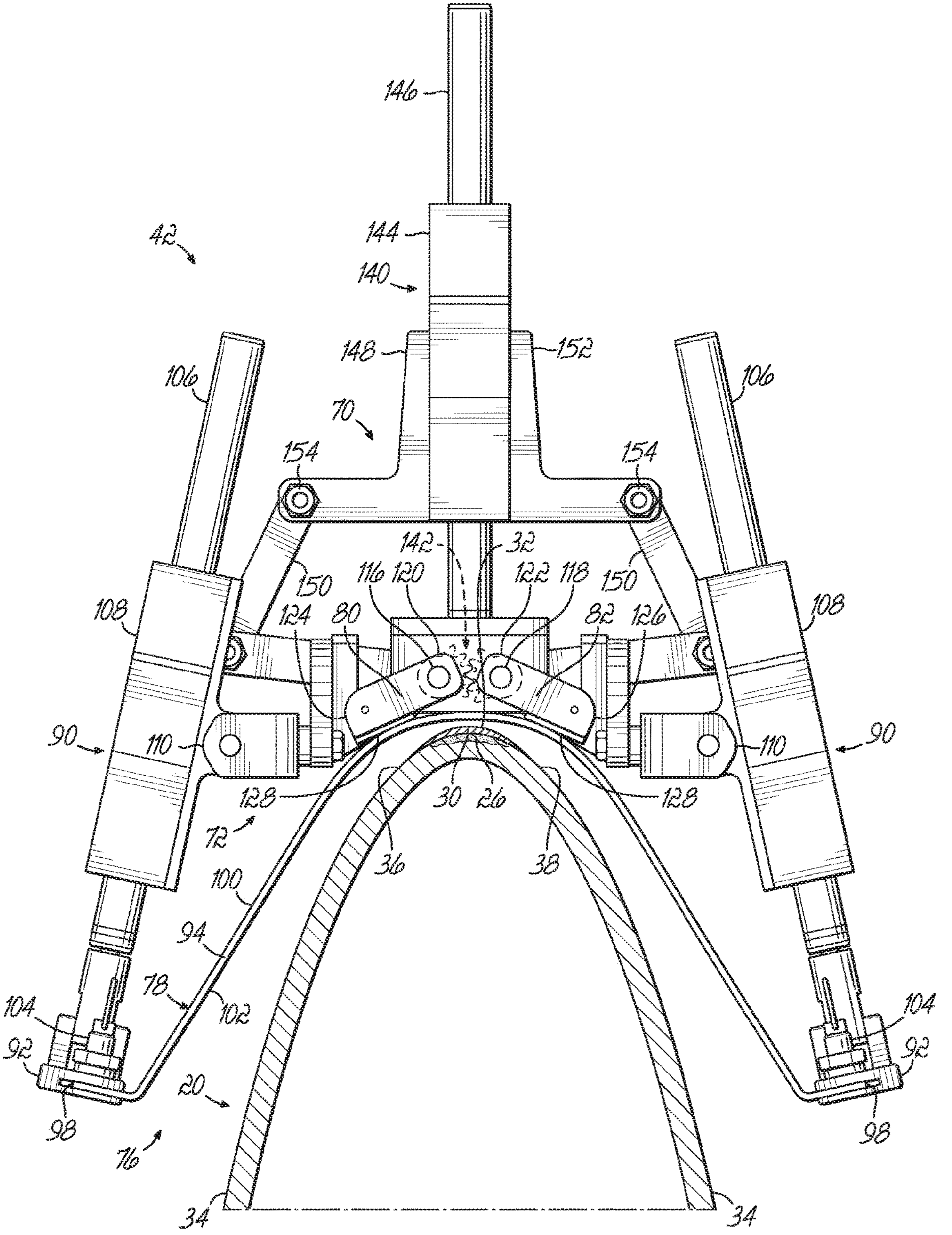
FIG. 6B is a front view of the applicator tool of FIG. 5 illustrating an unactuated position of the first and second chamfer arms.
Figure 7:
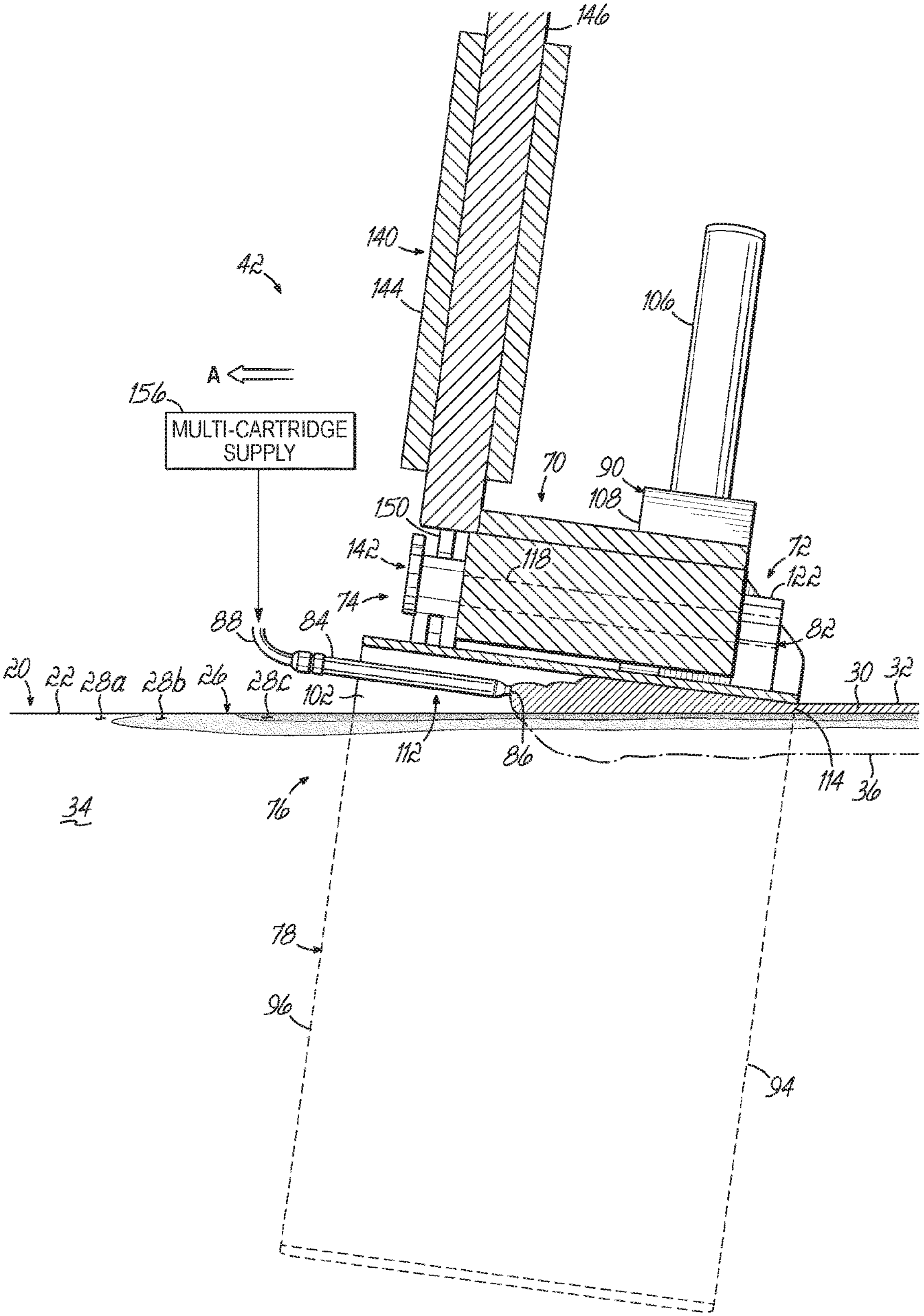
FIG. 7 is a cross-sectional side view through the applicator tool and wind turbine blade shown in FIG. 5.

FIGS. 5-7 illustrate an applicator tool 42 in accordance with one embodiment of the invention, and more particularly, the use of the applicator tool 42 for making a repair to the leading edge 22 of the wind turbine blade 20. In accordance with this embodiment, the applicator tool 42 includes a frame 70 having a front support 72 and a rear support 74. The applicator tool 42 also includes a spatula 76 having an extrusion plate 78 for shaping the coating 30 applied to the leading edge 22 of the wind turbine blade 20. The front support 72 of the frame 70 includes a first chamfer arm 80 and a second chamfer 82 arm operatively coupled thereto and configured to engage the extrusion plate 78 at specific engagement locations on opposing sides of the wind turbine blade 20 to shape the coating material 30. The rear support 74 includes a nozzle 84 positioned thereunder and having a nozzle outlet 86 located under the spatula 76, and more particularly the extrusion plate 78. The nozzle 84 is operatively coupled with a feed tube 88 or pipe to a source of coating material (such as multi-cartridge supply 156, described below) and is configured to supply the coating material 30 onto the leading edge 22 of the wind turbine blade 20 during repair operations. The source of coating material 30 may be a material supply container located on the maintenance device 40, for example. In one embodiment, the nozzle 84 may be supported by the frame 44 of the maintenance device 40. In another embodiment, the nozzle 84 may be supported by the tool head 50 of the maintenance device 40.

With continued reference to FIGS. 5-7, the extrusion plate 78 extends generally between the front support 72 and rear support 74 of the frame 70 of the applicator tool 42 and is supported below the frame 70 by a pair of support arms 90 that terminate in respective U-shaped plates 92 having slots configured to receive and retain a corresponding edge 98 and part of the extrusion plate 78 therein. In an exemplary embodiment, the extrusion plate 78 of the spatula 76 is generally flexible or bendable and made from, for example, rubber or other generally flexible engineering plastics. The extrusion plate 78 may be generally rectangular in shape and include a front edge 94, a rear edge 96 facing the robotic maintenance device, and opposed side edges 98 that extend between the front and rear edges 94, 96. The extrusion plate 78 may further include an outer surface 100 and an inner surface 102. The outer surface 100 is configured to face away from the leading edge 22 of the wind turbine blade 20 during use and the inner surface 102 is configured to face toward the leading edge 22 of the blade 20 during use (see FIGS. 6A and 6B). In an exemplary embodiment, the extrusion plate 78 may be about 1 millimeter (mm) to about 2 mm in thickness between the outer and inner surfaces 100, 102. More preferably, the extrusion plate 78 may be about 1.5 mm in thickness. Other thickness values, however, may be possible depending on the particular application. The extrusion plate 78 may be formed from a low-friction material or include a coating, such as a polytetrafluoroethylene coating, that provides at least the inner surface 102 with low-friction characteristics.

The support arms 90 are configured to press the extrusion plate 78 against the outer surfaces 34 of the wind turbine blade 20. More particularly, the extrusion plate 78 is held against the wind turbine blade 20 such that a central axis A1 of the extrusion plate 78 is aligned with the leading edge 22 of the blade 20. To press the extrusion plate 78 against the blade 20, the side edges 98 of the extrusion plate 78 are received within and retained by corresponding plates 92 of each support arm 90. The plates 92 include one or more fasteners 104 configured to secure the extrusion plate 78 in place to each corresponding plate 92. More particularly, the fasteners 104 are positioned through corresponding apertures in the plate 92 and extrusion plate 78 which are aligned to receive part of the fastener 104 therethrough to thereby couple each corresponding portion of the extrusion plate 78 to the corresponding plate 92. The fasteners 104 may be a quick lock mechanism such as a quick release push lock pin, for example.

To engage the extrusion plate 78 with the surfaces 34 of the blade 20, each support arm 90 includes a piston 106 and an actuator 108 configured to drive the piston 106 up and down. As shown, each piston 106 extends between the corresponding actuator 108 and plate 92 to position the plate 92 and corresponding side edge 98 of the extrusion plate 78 downward along the respective sides of the wind turbine blade 20. As shown, the support arms 90 are hingeably coupled to the front support 72 of the frame 70 and are configured to pivot about respective joints 110. In this regard, as the pistons 106 are driven downward or raised by the actuators 108, each support arm 90 is permitted to freely pivot about the frame 70 at the corresponding joint 110. Thus, when the pistons 106 are in an extended position, as shown in FIG. 6A, the support arms 90 are pivoted towards the blade to engage the extrusion plate 78 against the surfaces 34. The support arms 90 are in this position during blade 20 repair operations. When the pistons 106 are retracted, as shown in FIG. 6B, the extrusion plate 78 is permitted to flex away from the wind turbine blade 20 thereby forcing the support arms 90 to pivot away from the blade 20.

The robotic maintenance device 40 is configured to support the applicator tool 42, and more particularly position the spatula 76 and extrusion plate 78 over the leading edge 22 of the blade 20 during repair operations. In this regard, the frame 70 may be supported from the tool head 50 of the maintenance device 40 with two or more piston arrangements (not shown), for example. The pistons may be comprise a gas or hydraulic cylinder and actuator and be configured to raise, lower, and tilt the frame 70 and applicator tool 42 relative to the leading edge 22 of the blade 20, as shown in FIG. 5. As shown, the front support 72 of the frame is positioned closer to the leading edge 22 compared to the rear support 74 resulting in the applicator tool being generally angled relative to the leading edge 22 during the repair operations. More particularly, the rear edge 96 of the extrusion plate is above the blade 20 a greater distance than the front edge 94. The distance between the front edge 94 of the extrusion plate 78 and the leading edge 22 may be between about 3 mm and about 8 mm. More preferably, the front edge 94 may be spaced from the leading edge about 5 mm. The positioning of the spatula 76 and extrusion plate 78 in this manner provides a gap 112 between the outer surface 34 of the blade 20 and the inner surface 102 of the extrusion plate 78. The gap 112 generally corresponds to the desired shape of the coating 30, and as the applicator tool 42 is moved along the leading edge 22 of the blade 20, the coating material 30 is essentially extruded from the gap 112 at an opening 114 proximate to the front edge 94 of the extrusion plate 78 to ultimately define the coating 30. In the embodiment shown, the gap 112 is a funnel-shaped space between the blade 20 and the extrusion plate 78 wherein the area between the blade 20 and the extrusion plate 78 decreases in a direction toward the front edge 94 of the extrusion plate 78. To this end, the nozzle 84 is configured to extend into the gap 112, between the rear edge 96 of the extrusion plate 78 and the leading edge 22 of the blade 20, and deliver the coating material 30 within this funnel-shaped space to form the coating 30.

In one embodiment, the spatula 76 may include a spacer configured to maintain the gap 112 between the outer surface 34 of the blade 20 and the inner surface 102 of the extrusion plate 78. The one or more spacers may include a rigid blade or spine disposed beneath the inner surface 102 of the extrusion plate 78. The rigid spine may shaped similarly to the desired shape of the gap 112 (e.g., triangular or funnel shaped) and is configured to engage with the leading edge 22 of the wind turbine blade 20 during use. In this regard, the configuration of the spine maintains the gap 112 between the outer surface 34 of the blade 20 and the inner surface 102 of the extrusion plate 78. In this embodiment, the nozzle 84 may be coupled to the spine at one end thereof. In one embodiment, the spine may be integrally formed with the end of the feed tube 88. In an alternative embodiment, these elements may be separate and subsequently coupled together.

With reference to FIGS. 5-7, the first and second chamfer arms 80, 82 are operatively coupled to the front support 72 of the frame 70 and work together with the extrusion plate 78 to shape the coating material 30 applied to the leading edge 22 of the blade 20. More particularly, the first and second chamfer arms 80, 82 each engage the outer surface 100 of the extrusion plate 78 adjacent the front edge 94 to press the extrusion plate 78 against the exterior surface 34 of the wind turbine blade 20 at two specific engagement locations on opposing sides of the leading edge 22 of the wind turbine blade 20. In this regard, during application of the coating material 30, the first chamfer arm 80 forms the first chamfer line 36 where the coating material 30 terminates along one side of the wind turbine blade 20 and the second chamfer arm 82 forms the second chamfer line 38 where the coating material 30 terminates along the opposite side of the wind turbine blade 20.

The first and second chamfer arms 80, 82 are configured to synchronously rotate about the frame 70 of the applicator tool 42 to simultaneously engage the extrusion plate 78 on opposing sides of the leading edge 22 of the blade 20. In this regard, the frame 70 includes a first and second drive shaft 116, 118, each extending a length of the frame 70 from the rear support 74 to the front support 72. More particularly, the first and second drive shafts 116, 118 each extend from a driven end located at the rear support 74 of the frame 70 to an operative end located at the front support 72 of the frame 70. The operative end of each drive shaft is configured to couple with each corresponding chamfer arm 80, 82. As shown, a proximal end 120 of the first chamfer arm 80 is coupled with the operative end of the first drive shaft 116 and a proximal end 122 of the second chamfer arm 82 is coupled with the operative end of the second drive shaft 118. Thus, the drive shafts 116, 118 are configured to pivotally move the first and second chamfer arms 80, 82 about the frame 70 to engage a distal end 124 of the first chamfer arm 80 and a distal end 126 of the second chamfer arm 82 with the extrusion plate 78 at specific engagement locations along the surfaces 34 of the wind turbine blade 20.

The first and second chamfer arms 80, 82 may be formed from a rigid material and the distal end 124, 126 of each of the first and second chamfer arms 80, 82 may include a compression pad 128 to engage with the outer surface 100 of the extrusion plate 78. The pads 128 may be formed of at least partially resilient material configured to transfer forces from the first and second chamfer arms 80, 82 to produce the first and second chamfer lines 36, 38 without causing damage to the extrusion plate 78 or to the wind turbine blade 20.

The applicator tool 42 further includes a drive cylinder 140 configured to rotate the first and second drive shafts 116, 118 to thereby engage the respective chamfer arms 80, 82 with the extrusion plate 78. The drive cylinder 140 is operatively coupled to a gear assembly 142 located on the applicator tool frame 70 and connected to the driven ends of the first and second drive shafts 116, 118. As shown, the driven ends of the first and second drive shafts 116, 118 each include a gear with the teeth of the gears being in contact with each other to ensure synchronous movement of the first and second chamfer arms 80, 82 as the drive shafts 116, 118 are driven by the drive cylinder 140. The drive cylinder 140 is located on the frame 70 adjacent to the rear support 74 and includes a piston tube 144 and a piston rod 146. The piston tube 144 includes a first leg 148 operatively coupled to the driven end of the first drive shaft 116 with a series of movable linkages 150, and further includes a second leg 152 operatively coupled to the driven end of the second drive shaft 118 with a series of movable linkages 150. Each corresponding linkage 150 is interconnected using a pin 154, nut and bolt combination, or other suitable structure to permit movement of the linkages 150 relative to one another as the piston tube 144 moves up and down the piston rod 146. More particularly, as the piston tube 144 moves down the piston rod 146, the drive shafts 116, 118 are rotated counterclockwise through transferred movement by the linkages 150 to thereby engage the distal ends 124, 126 of the first and second chamfer arms 80, 82 with the extrusion plate 78, as shown in FIG. 6A. It will be appreciated that the chamfer arms 80, 82 are actively driven in such a manner to maintain force on the chamfer arms 80, 82 to continue stopping flow of the coating material beyond the two engagement positions during application and shaping of the coating 30. The chamfer arms 80, 82 are in this position during blade 20 repair operations. Similarly, as the piston tube 144 is moved upwardly along the piston rod 146, the drive shafts 116, 118 are rotated clockwise through transferred movement by the linkages 150 to thereby disengage the distal ends 124, 126 of the first and second chamfer arms 80, 82 from the extrusion plate 78, as shown in FIG. 6B. The piston tube 144 may be incrementally adjusted to pivotally move and adjust the location of the first and second chamfer arms 80, 82 about the frame 70. The chamfer arms 80, 82 may be adjusted in this way to adjust a position of the engagement locations where the distal ends 124, 126 of the first and second chamfer arms 80, 82 engage the extrusion plate 78, for example.

As will be explained in detail below, the applicator tool 42 may be moved along the leading edge 22 of the wind turbine blade 20 to apply the coating 30 to the blade 20. In this regard, the spatula 76, and more particularly the extrusion plate 78, is configured to engage with the wind turbine blade 20 and extrude coating material applied to the blade 20 immediately behind the extrusion plate 78 of the spatula 76 such that after the spatula 76 passes over the deposited coating material 30, the coating 30 has the desired smoothness and shape. As noted above, the frame 70 of the applicator tool 42 is angled relative to the leading edge 22 to form the gap 112 between the outer surfaces 34 of the wind turbine blade 20 and the inner surface 102 of the extrusion plate 78. After positioning the spatula 76 into a desired position, the gap 112 directly corresponds to the desired shape of the coating 30, and as the applicator tool 42 is moved along the leading edge 22 of the blade 20, the coating material 30 is essentially extruded from the opening 114 of the gap 112 to ultimately define the coating 30. In this regard, the opening 114 of the gap 112 defines a height profile that generally corresponds to the shape of the coating 30 from the applicator tool 42. By way of example, the height profile may have a maximum adjacent the central axis A1 of the extrusion plate 78 and decay to substantially zero adjacent the first and second chamfer lines 36, 38. The first and second chamfer arms 80, 82 engage the extrusion plate 78 proximate the opening 114 of the gap 112 to maintain the shape of the opening 114 and overall shape of the coating material 30 exiting the opening 114, as well as prevent the spread of coating material 30 beyond the first and second chamfer lines 36, 38. Thus, it is the chamfer arms 80, 82 in combination with the extrusion plate 78 that defines the shape and thickness of the shaped coating 30 applied to the leading edge 22 of the blade 20.

FIG. 7 illustrates the use of the applicator tool 42 for making a repair to the leading edge 22 of the wind turbine blade 20 in greater detail. To effectuate maintenance and repair of damage 26 on the leading edge 22 of the wind turbine blade 20, the applicator tool 42 may be positioned on the blade 20 with the frame 70 spaced from, and angled relative to, the leading edge 22 as shown and described above. The support arms 90 may press the extrusion plate 78 against the outer surfaces 34 of the blade 20 to form the desired gap 112 between the leading edge 22 and the inner surface 102 of the extrusion plate 78. When so positioned, the central axis A1 of the extrusion plate 78 may be configured to be aligned with the leading edge 22 of the blade 20. The drive cylinder 140 applies a driving force to the drive shafts 116, 118 to maintain an engagement of the first and second chamfer arms 80, 82 with the extrusion plate 78, as described above. The coating material may then be directed to the nozzle outlet 86 for deposit in the funnel-shaped gap 112 between the surface 34 of the blade 20 and the extrusion plate 78.

As the coating material fills the gap 112, the applicator tool 42 may be moved along the leading edge 22 of the blade 20 as demonstrated by arrow A in FIG. 7. As the applicator tool 42 moves, the coating material 30 is forced into the gap 112 toward the front edge 94 of the extrusion plate 78 and is essentially extruded from opening 114 at the front edge 94 of the extrusion plate 78. In this regard, the height of the coating material, or thickness, is dictated by the height profile of the opening 114.

As the robotic maintenance device 40 moves along the leading edge of the wind turbine blade 20, the drive cylinder 140 continues to apply a driving force on the first and second chamfer arms 80, 82 to maintain their engagement with the extrusion plate 78. As described above, the engagement between the distal ends 124, 126 of the first and second chamfer arms 80, 82 at specific engagement locations on opposing sides of the leading edge 22 of the blade 20 form the first and second chamfer lines 36, 38. The coating 30 applied to the wind turbine blade 20 extends between the first and second chamfer lines 36, 38 to cover and fill in the erosion damage 26, as shown in FIG. 3. In this regard, the first and second chamfer lines 36, 38 are where the coating 30 terminates along the opposing sides of the wind turbine blade 20. Thus, after the coating material 30 is applied to the outer surface 34 of the wind turbine blade 20, the coating material 30 forms a smooth and continuous coating 30 having a profile dictated by the height profile of the extrusion plate 78 and terminates along the first and second chamfer lines 36, 38 as dictated by the chamfer arms 80, 82. It should be understood that after the coating 30 has dried or cured, the applicator tool 42 may be used to make additional passes over the damage 26 on the leading edge 22 of the blade 20. In this way, the final coating 30 may be comprised of a plurality of layers, with each layer applied using the applicator tool 42 as described above.

As described above, the maintenance device 40 includes a coating supply source having at least one supply container containing a predetermined quantity of coating material 30. The nozzle 84 may be operatively connected to the supply container with the feed tube 88 or pipe to supply the coating material 30 to the nozzle 84 and applicator tool 42. In one embodiment, the coating material 30 contained in the supply container may be a 2-component mixture that is pushed through a static mixer or some other mixing element before flow through the feed tube 88, with the resulting coating material 30 having a suitable viscosity that allows the material 30 to flow under the influence of gravity and surface tension effects to form a smooth and continuous coating. The supply container may be pressurized to discharge the coating material 30 or the maintenance device 40 may be equipped with a drive element operatively engaged with the supply container to deliver the coating material 30 from the supply container to the nozzle 84. It will be understood that the coating material 30 is not discharged from the supply container (the components thereof) until repair actions are to be done, as the mixed coating material 30 can solidify in the feed tube 88 and/or the nozzle 84 after being mixed for a period of time.

Figure 7A:
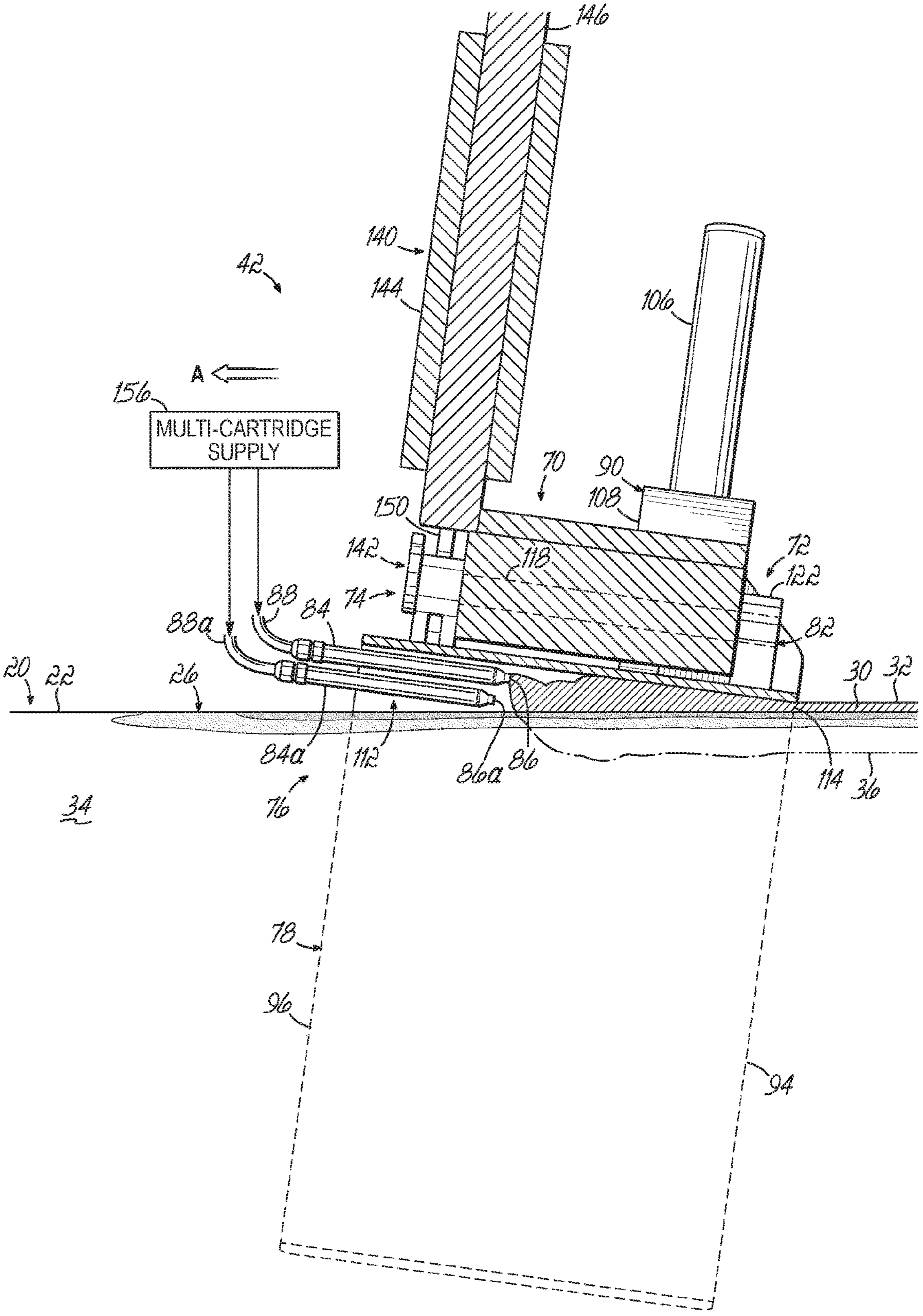
FIG. 7A is a cross-sectional view similar to FIG. 7 illustrating the applicator tool according to an alternative embodiment of the invention with the applicator tool having at least two coating nozzles.

In accordance with another embodiment of the invention shown in FIG. 7A, the applicator tool 42 may include at least two nozzles 84, **84*a* and the robotic maintenance device 40 may include a separate coating material supply container corresponding to each nozzle 84, 84*a* to increase a total amount of coating material 30 applied and/or a total length of the leading edge 22 of the wind turbine blade 20 that can be repaired by the robotic maintenance device 40. The nozzle outlets 86, 86*a* for the nozzles 84, 84*a* may be arranged in a side-by-side relationship under the spatula 76 to feed coating material 30 into the gap 112. Each coating supply container is independently connected to one of the nozzles 84, 84*a* with a separate feed tube 88, 88*a*. During repair operations, the applicator tool 42 applies coating material 30 from a first nozzle 84 until the corresponding first coating material supply container is about to be exhausted, at which point the applicator tool 42 begins applying coating material 30 from a second nozzle 84*a* and corresponding material supply container to thereby maintain a consistent supply rate of the coating material 30 to the spatula 76. Depending on the desired quantity of nozzles 84, 84*a*, the applicator tool 42 will continue to switch between nozzles 84 to maintain a consistent supply rate of coating material 30 to the spatula 76 as each supply container is exhausted. To this end, the applicator tool 42 may include three, four, five, or more nozzles 84, 84*a*** and corresponding coating supplies as desired.

The one or multiple coating material supply containers for each corresponding nozzle 84, **84*a* may be supported on the robotic maintenance device 40 in a multi-cartridge supply or storage rack 156, which is shown schematically in FIGS. 5, 7, and 7A. The storage rack 156 may be located on the main frame 44 of the maintenance device 40 and accessible so that exhausted material supply containers may be easily switched out and replaced. To this end, the storage rack 156 may be configured with a revolver-style storage that can rotate to provide access to switch out or connect new supply containers as needed. The storage rack 156 may have a manifold configured to receive and connect each of the supply containers to the respective feed tubes 88, 88***a* to supply coating material 30 to the corresponding nozzles 84, 84*a*.

By including multiple independent supply containers at the multi-cartridge supply 156, the overall length of the wind turbine blade 20 on which the coating 30 can be applied can be increased accordingly, e.g., without requiring the supply containers to be made so large that the forces needed to dispense the coating material successfully through a mixer, through the feed tube 88, and into the nozzle 84 is not made too large for the dispense drive components of the maintenance device 40, or made so large that the coating material is likely to solidify in the feed tube 88 or in the nozzle 84 during a normal repair action operation. In one particular example, each supply container may be supplied with enough coating material to apply the shaped coating 30 to about 12 meters of longitudinal length along the leading edge 22 of the blade 20, and typical repairs for a 60 meter long blade 20 can extend over 20 meters, thereby requiring supply from at least two supply containers.

Figure 8:
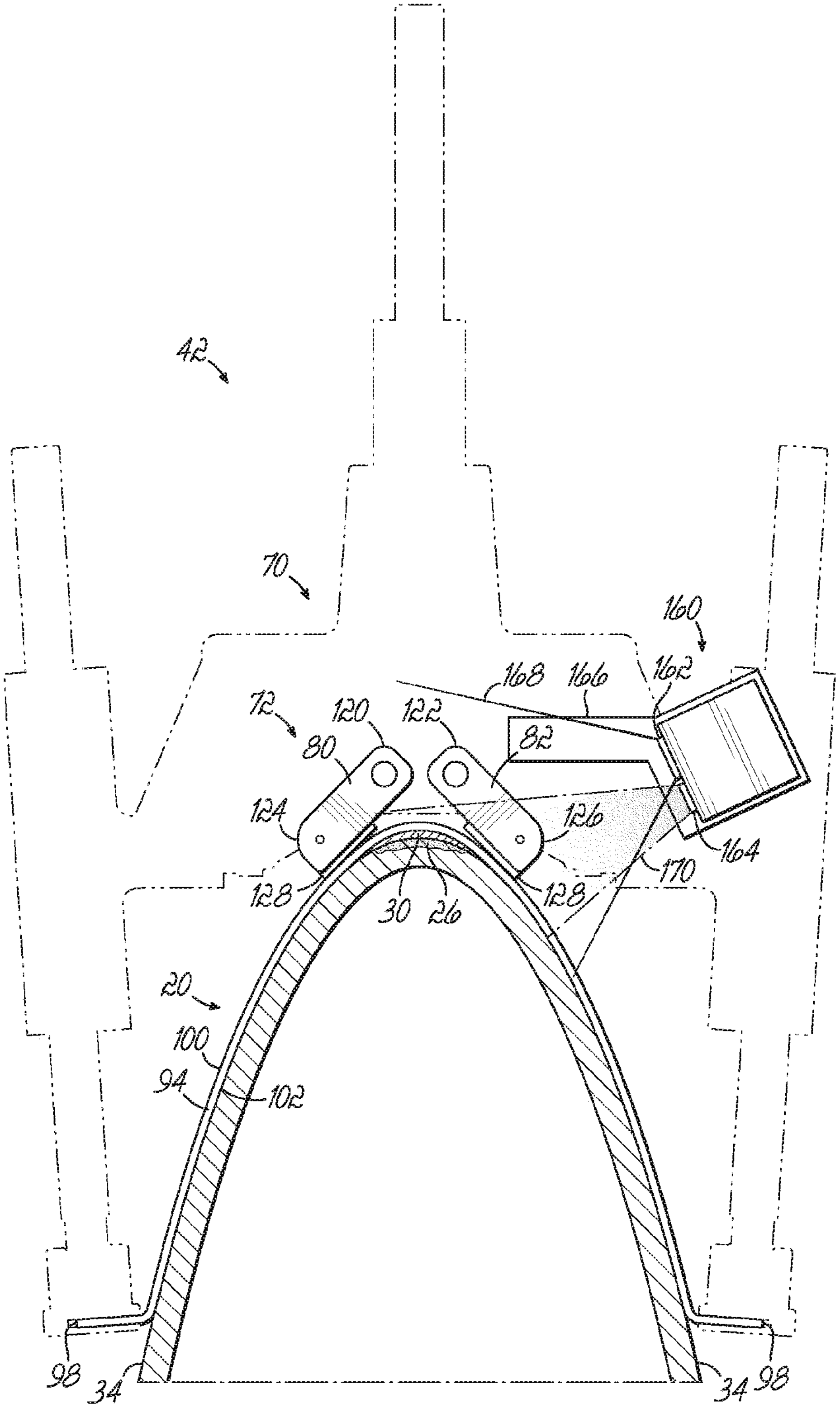
FIG. 8 is a front view of an applicator tool according to one embodiment of the present invention showing a vision system.
Figure 9A:
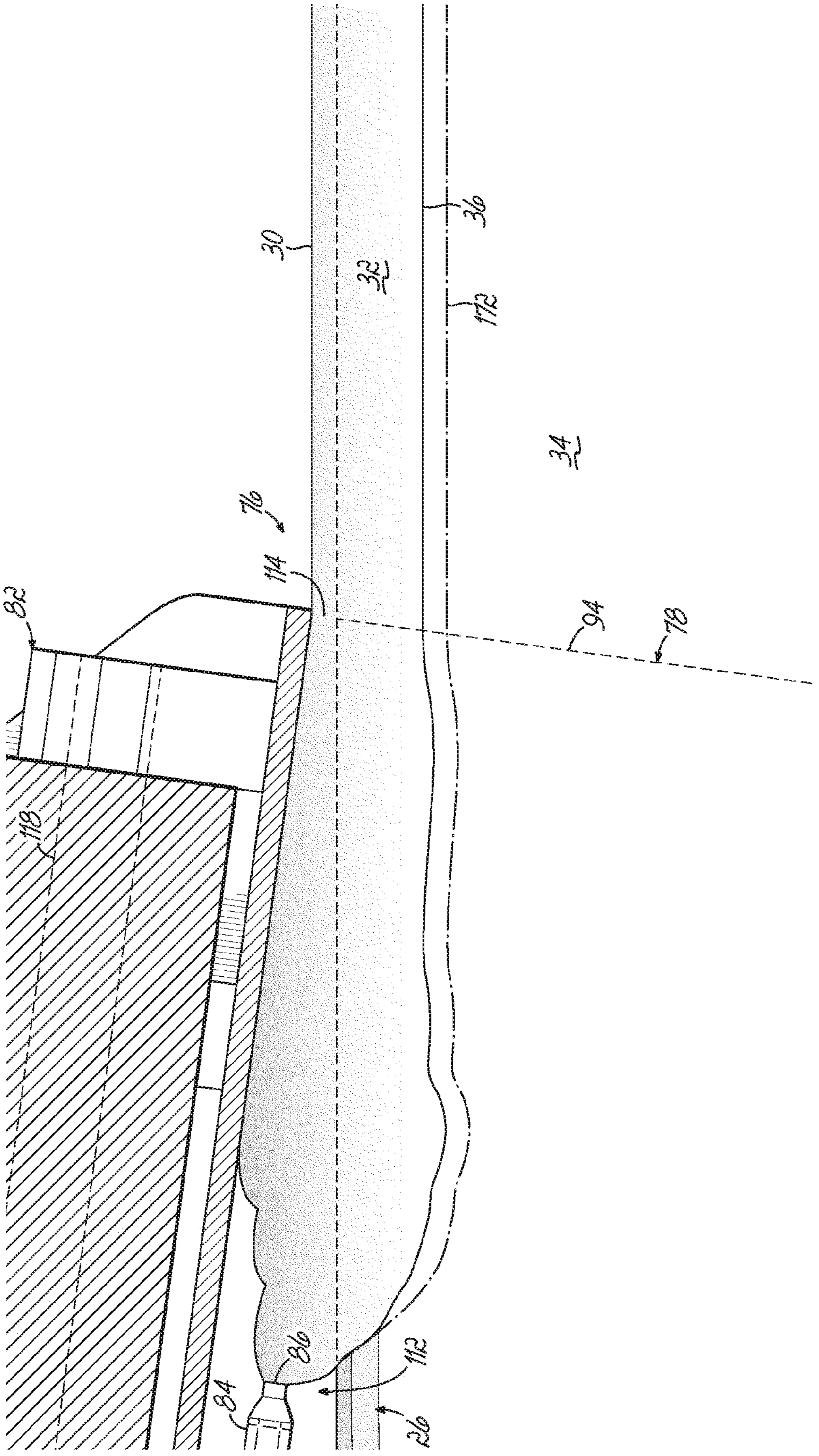
FIG. 9A is a side elevation view of the applicator tool shown in FIG. 5 being used to repair damage to the leading edge of the wind turbine blade illustrating detection of an underfill condition by the vision system.
Figure 9B:
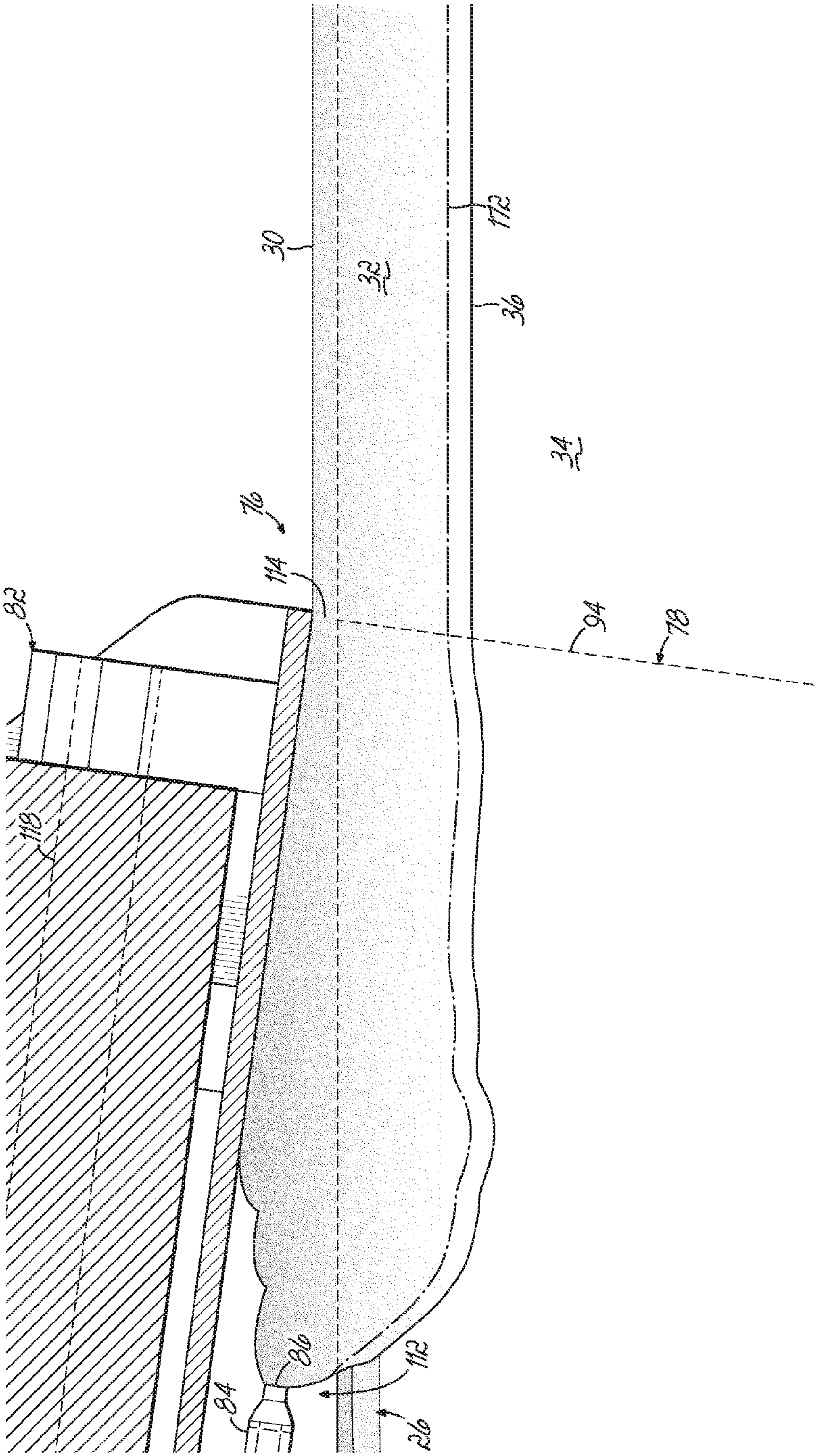
FIG. 9B is a view similar to FIG. 9A illustrating detection of an overfill condition by the vision system.

FIGS. 8-9B illustrate an applicator tool 42 in accordance with another embodiment of the invention, which may be combined with the embodiments described above and below in any combination. The applicator tool 42 is similar to that described above in that the tool 42 is configured to apply a coating 30 to damage 26 on the leading edge 22 of the wind turbine blade 20 in an improved manner. However, the applicator tool 42 of this embodiment also includes a vision system 160 configured to detect, based on captured images, a specific location along the exterior surface 34 where the coating material 30 terminates to define the first and second chamfer lines 36, 38.

As illustrated in FIG. 8, the vision system 160 includes at least one imaging device 162 and optionally also at least one illumination element 164, these elements being attached to a support plate 166 positioned on the front support 72 of the frame 70. In the embodiment shown, the support plate 166 is positioned adjacent to the second chamfer arm 82 with the vision system 160 being configured to image and detect the second chamfer line 38 during repair operations. However, it is understood that a second vision system could be used to also image and detect the first chamfer line 36. As shown, the support plate 166 is configured to angle the visions system 160 so that the imaging device 162 and more particularly an angle of view 168 of the imaging device 162 is directed towards the second chamfer arm 82 to image the second chamfer line 38. Similarly, the illumination device 164 is also directed toward the second chamfer arm 82 so that the second chamfer line 38 is positioned within an illumination area 170 of the illumination device 164. The support plate 166 is configured to extend a distance from the front support 72 of the frame 70 to position the vision system 160 downstream from the frame 70 and applicator tool 42 (e.g., in a direction away from and along the leading edge 22 of the wind turbine blade 20). That way, the vision system 160 can capture images of the coating material 30 after it is applied to the leading edge 22 of the blade 20 by the applicator tool 42. In an alternative embodiment, the support plate 166 may be mounted in some manner to the first or second chamfer arms 80, 82. This configuration allows the vision system 160 to move with the chamfer arms 80, 82 to keep the distal end 124, 126 of the chamfer arms 80, 82 within the angle of view 168 and illuminated area 170 at all times.

With reference to FIGS. 8, 9A and 9B, the imaging device 162 is configured to image or photograph the exterior surface 34 of the wind turbine blade 20 during repair operations. The vision system 160 is programmed to detect from these images a location along the exterior surface 34 of the wind turbine blade where the coating 30 terminates to thereby define the first or second chamfer line 36, 38. The vision system 160 is also programed to include an expected position 172 for the chamfer line 36 being detected to compare against the detected or actual position of the chamfer line 36 in the images. The expected position 172 for the chamfer line 36 may be predetermined based on a desired size of the shaped coating 30. In one particular preferred example, this desired size and the expected positions 172 of the chamfer lines 36, 38 are set based on the edges of where the blade surface has been abraded/sanded to prepare for receiving the coating 30, which will help assure the bond between the coating 30 and the blade 20 will not slip or otherwise fail in operation. However, the expected position 172 may also be determined based on an initial image and analysis of the damage 26 to the leading edge 22 of the wind turbine blade 20. Typically, the expected termination position 172 is also the specific engagement location on the side of the wind turbine blade 20 where the chamfer arms 80, 82 press the extrusion plate 78 against to form the chamfer lines 36, 38.

In any event, the vision system 160 is configured to detect an underfill condition or an overfill condition and cause a variation of the supply rate of the coating material 30 to correct for such conditions accordingly, as will be described in further detail below. By underfill condition, it is meant that the detected chamfer line 36, 38 fails to reach the expected termination position 172 for the coating material 30. That is, the detected chamfer line 36, 38 is located between the expected termination position 172 and the leading edge 22 of the wind turbine blade 20. An underfill condition is illustrated in FIG. 9A. By overfill condition, it is meant that the detected chamfer line 36, 38 exceeds the expected termination position 172 for the coating material 30. Here, the detected chamfer line 36, 38 is located between the expected termination position 172 and the trailing edge of the wind turbine blade 20. An overfill condition is illustrated in FIG. 9B.

To vary the supply rate of the coating material 30 to the spatula 76, the vision system 160 and drive element for the coating material supply container used to deliver the coating material 30 from the supply container to the nozzle 84 are operatively coupled to a controller, which may be the control system 52 of the maintenance device 40. Based on input received from the vision system 160, the controller is configured to increase or decrease a driving force exerted by the drive element on the material supply container to thereby increase or decrease the supply rate of the coating material 30 to the spatula 76. More particularly, if the chamfer line 36, 38 is detected to be in an underfill condition (FIG. 9A) by the vision system 160, the controller sends a signal to the drive element to increase the supply rate of the coating material 30 to the nozzle 84. If the vision system 160 detects and overfill condition (FIG. 9B), the controller sends a signal to the drive element to decrease the supply rate of the coating material 30 to the nozzle 84. If the chamfer line 36, 38 is detected to be at the expected position 172, a current supply rate of the coating material 30 is maintained. The rate of detection of the chamfer line 36, 38 by the vision system 160 may vary depending on the application. For example, the detection rate may be every second. However, the detection rate may be increased or decreased as desired. The vision system 160 may be programmed to include a certain degree of acceptable deviation of the chamfer line 36, 38 from the expected position 172, such as between 5 to 20 percent variance, for example.

It may be possible for the imaging device 162 to accurately detect the position of the chamfer line 36, 38 using just ambient light available in the external environment. To this end, the applied coating 30 will typically have a different (e.g., more shiny or reflective) reflectivity as compared to the pre-existing exterior surface 34 of blade 20. The applied coating 30 may also be a slightly distinct color upon initial application from the remainder of the blade 20. Thus, the imaging device 162 typically uses a distinction in reflectivity or color to identify where the coating 30 terminates on the blade 20, which defines where the chamfer line 36, 38 is actually positioned.

In embodiments including the illumination element 164, the illumination element 164 of the vision system 160 is configured to direct light energy onto the exterior surface 34 of the wind turbine blade 20, proximate a location where the chamfer arms 80, 82 press the extrusion plate 78 against the exterior surface 34 of the wind turbine blade 20 to form the chamfer lines 36, 38, to thereby illuminate the surface 34 when the imaging device 162 images the exterior surface 34 of the wind turbine blade 20. The illumination device 164 may be useful in certain situations where the vision system 160 is unable to detect the chamfer lines 36, 38 using ambient light, or where sufficient ambient light is unavailable to allow for an accurate read of the chamfer lines 36, 38. The illumination device 164 may be configured to direct visible spectrum light energy onto the exterior surface 34 of the blade 20 such that the vision system 160 detects where the coating terminates based on a change in reflectivity and/or color observed by the imaging device 162 when illuminated by the visible spectrum light energy, in a similar manner as set forth above.

In an alternative embodiment that may be preferred in some circumstances, the coating material 30 may include an ultraviolet material additive to improve detectability of the chamfer lines 36, 38 by the vision system 160. The illumination device 164 may then be configured to direct ultraviolet light energy onto the exterior surface 34 of the wind turbine blade 20. The ultraviolet material additive will provide a clear contrast between the coating material 30 and the remainder of the exterior surface 34 of the blade 20, thereby enhancing the ability of the vision system 160 to identify where the chamfer lines 36, 38 are and whether adjustments are needed to the coating supply rate. Regardless of the particular form in which the vision system 160 is provided, including the vision system 160 in the maintenance device allows for better adjustments to be made in real time during repair actions on the blade 20 to correct for any overfill or underfill conditions.

Figure 10:
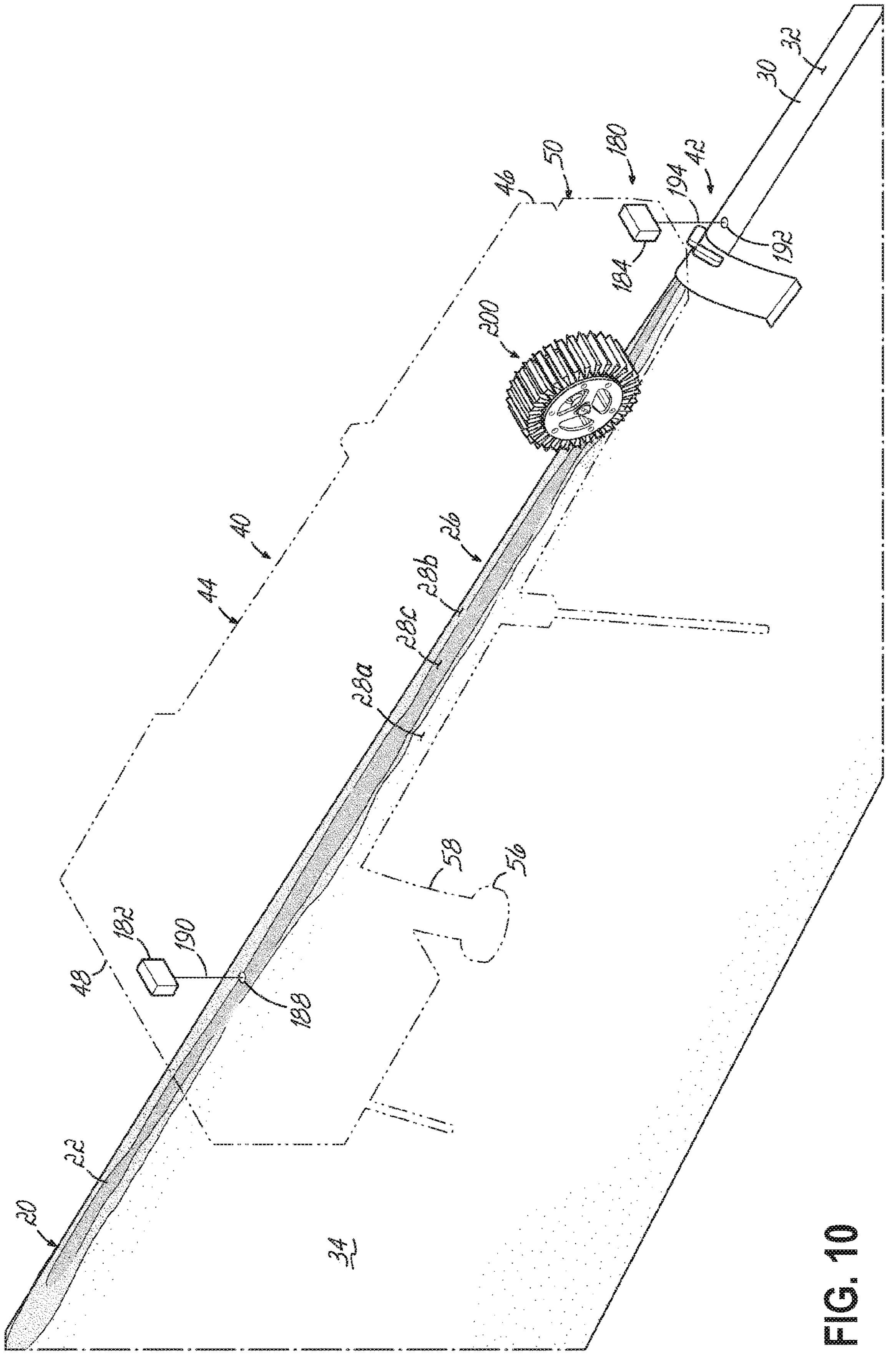
FIG. 10 is a top perspective view of a robotic maintenance device being mounted in position on the leading edge of the wind turbine blade according to one embodiment of the present invention, illustrating a repair verification scanner for determining a coating layer thickness of the shaped coating applied to the wind turbine blade.

FIG. 10 illustrates a robotic maintenance device 40 in accordance with another embodiment of the invention, which may be combined with the other embodiments described above in any combination or sub-combination. The maintenance device 40 is similar to that described above in that the maintenance device 40 includes an applicator tool 42 configured to apply coating material 30 to damage 26 on the leading edge 22 of the wind turbine blade 20 in an improved manner. Additionally, the maintenance device 40 of this embodiment includes a repair verification scanner 180 configured to detect a profile height or thickness of the coating material 30 applied to the leading edge 22 of the wind turbine blade 20. The thickness check may be used as a means for checking the quality of the coating 30 applied to the leading edge 22 of the wind turbine blade 20. The results of the thickness may be used to determine whether a second layer of coating 30 needs to be applied to the leading edge 22, for example.

The repair verification scanner 180 includes a first scanning element 182 located at the second end 48 of the maintenance device 40 and a second scanning element 184 located at the first end 46 of the maintenance device 40. The second scanning element 184 may be located on the tool head 50, for example. As shown, the first and second scanning elements 182, 184 are spaced apart along the leading edge 22 of the wind turbine blade 20 when the maintenance device 40 is positioned thereon. More particularly, the first scanning element 182 is positioned upstream from the applicator tool 42 and over the erosion damage 26 to the leading edge 22. The second scanning 184 element is positioned downstream from the applicator tool 42 and over the shaped coating 30 recently applied to the leading edge 22. In this regard, the first scanning element 182 scans the leading edge 22 at a point 188 before the shaped coating 30 is applied to detect a first profile height 190. The second scanning element 184 scans the leading edge 22 at a point 192 after the shaped coating 30 is applied to detect a second profile height 194. It will be understood that the specific positions of the first and second scanning element 182, 184 may be modified from the positions shown in FIG. 10 in other embodiments, so long as one is upstream from the applicator tool 42 and the other is downstream of the applicator tool 42. The profile heights 190, 194 are defined by a spacing, or distance, between the leading edge 22 and the corresponding first or second scanning elements 182, 184. The repair verification scanner 180 is programed to determine a coating layer thickness of the shaped coating 30 applied to the wind turbine blade 20 by determining a difference between the first and second profile heights 190, 194, or spacings, detected by the first and second scanning elements 182, 184. In the embodiment shown, the first and second scanning elements 182, 184 include infrared sensors to detect the profile heights 190, 194. However, other suitable sensors may be used such as a laser sensor or profile sensor to detect the profile heights 190, 194, for example.

In the exemplary embodiment, the first and second scanning elements 182, 184 perform continuous line scans of the leading edge 22 to detect continuous first and second profile heights 190, 194 over an entire working length of the leading edge 22 of the blade 20. That way, the thickness of the applied coating 30 can be determined for the entire length of the leading edge 22 where the applicator tool 42 applies the shaped coating 30 to repair the erosion damage 26. In an alternative embodiment, the scanning elements 182, 184 may scan the leading edge 22 intermittently at predetermined intervals or locations.

In one embodiment and as briefly alluded to in several places above, the maintenance device may also include a cleaning/abrading tool 200 that is configured to sand down the surface of the wind turbine blade 20 containing damage 26 and then clean that surface to prepare it for repair. The cleaning/abrading tool 200 is shown in FIG. 10, and may be located on the underside of the main body 44 of the maintenance device 40, for example. Once the damaged surface 26 is prepared with the cleaning/abrading tool 200, the applicator tool 42 is used to apply layers of coating material 30 to the prepared surface to fill in damaged areas 26 and thereby repair the blade 20. The chamfer arms 80, 82 may be adjusted to position the first and second chamfer lines 36, 38 of the shaped coating proximate edges of where the exterior surface 34 has been sanded, to thereby reduce the likelihood that the coating 30 will slip or have a bonding failure on the blade 20.

The embodiments of the applicator tool 42 described above improve maintenance and repairs for erosion damage 26 at the leading edge 22 of the wind turbine blade 20. More particularly, the applicator tool 42 provides an apparatus and method for applying a coating 30 over the damage 26 at the leading edge 22 so as to arrest further deterioration of the wind turbine blade 20. Additionally, the applicator tool 42 provides a coating 30 that has a desirable profile, i.e., having a maximum thickness at the leading edge 22 of the blade 20 and then decaying in thickness to substantially zero thickness away from the leading edge 22 so as to smoothly merge into the outer surfaces 34 of the wind turbine blade 20. The profile provided by the applicator tool 42 minimizes disruptions of the airflow over the blade 20 and any resulting reduction in aerodynamic performance as a result of those disruptions. The applicator tool 42 is particularly advantageous when repairing wind turbine blades 20 in field conditions when, for example, the blades 20 remain attached to the rotor hub 18 at the top of the tower 12 of the wind turbine 10, which helps minimize operational downtime that is caused to conduct the maintenance and repair actions. Thus, even in less than ideal field conditions, the applicator tool 42 is able to provide a high quality and precise repair of the damaged area 26 of the wind turbine blade 20.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. Moreover, the various features of the invention may be used alone or in any combination depending on the needs and preferences of the user, and the features described in the different embodiments are not dependent on one another for operation of the invention.

The invention claimed is:

1. An applicator tool configured to be used with a robotic maintenance device for repairing damage around a leading edge of a wind turbine blade on a wind turbine, the applicator tool comprising:

a tool frame configured to be connected at one end of the robotic maintenance device;

a spatula supported by the tool frame and configured to be engaged with an exterior surface of the wind turbine blade, the spatula including a flexible extrusion plate having a front edge, a rear edge facing the robotic maintenance device, a central axis configured to be aligned with the leading edge of the wind turbine blade, a pair of opposed side edges, an outer surface, and an inner surface, wherein the flexible extrusion plate is configured to define a gap between the inner surface thereof and the exterior surface of the wind turbine blade;

a first nozzle including a nozzle outlet located under the spatula to deliver a coating material into the gap as the robotic maintenance device moves the spatula along the leading edge of the wind turbine blade; and a first chamfer arm and a second chamfer arm operatively coupled to the tool frame, and each engaging the outer surface of the extrusion plate of the spatula adjacent the front edge to press the extrusion plate against the exterior surface of the wind turbine blade at two specific engagement locations on opposing sides of the leading edge of the wind turbine blade, wherein the two engagement locations are closer to the central axis than the side edges of the extrusion plate, the spatula being configured to shape the coating material into a shaped coating as the coating material spreads in the gap to thereby fill in and cover the damage on the wind turbine blade, and the first and second chamfer arms being configured to limit spread of the coating material beyond the two specific engagement locations such that the shaped coating applied to the wind turbine blade extends between a first chamfer line and a second chamfer line on opposite sides of the leading edge.

2. The applicator tool of claim 1, wherein each of the first and second chamfer arms includes a proximal end and a distal, and the applicator tool further comprises:

first and second drive shafts extending from the tool frame so as to be coupled with the proximal ends of the first and second chamfer arms the drive shafts being configured to pivotally move the first and second chamfer arms to adjust a position of the two specific engagement locations where the distal ends of the first and second chamfer arms engage the extrusion plate of the spatula.

3. The applicator tool of claim 2, further comprising:

a gear assembly located on the tool frame and connected to the first and second drive shafts; and a drive cylinder that actuates the gear assembly to synchronously rotate the first and second chamfer arms to pivot the distal ends towards or away from the spatula.

4. The applicator tool of claim 3, wherein the drive cylinder actively applies a driving force to the gear assembly during delivery of the coating material under the spatula to maintain an engagement of the first and second chamfer arms with the extrusion plate as the spatula and the robotic maintenance device move along the leading edge of the wind turbine blade.

5. The applicator tool of claim 2, wherein the first and second chamfer arms are formed from a rigid material and the distal end of each the first and second chamfer arms further includes a pad to engage with the outer surface of the extrusion plate on the spatula, the pad being at least partially resilient to transfer forces from the first and second chamfer arms to produce the first and second chamfer lines without causing damage to the spatula or to the wind turbine blade.

6. The applicator tool according to claim 1, further comprising:

a vision system including at least one imaging device configured to image the exterior surface of the wind turbine blade, such that the vision system detects, based on images from the at least one imaging device, a specific location along the exterior surface where the coating terminates to define the first and second chamfer lines; and a controller operatively coupled to the vision system and to a drive element of the robotic maintenance device that can vary a supply rate of the coating material delivered to the first nozzle, the controller being programmed to determine, based on information from the vision system, whether the first and second chamfer lines of the shaped coating are located at an expected position defined by a desired size of the shaped coating, and then to send a signal to the drive element to cause the supply rate of the coating material to the nozzle be varied when the first and second chamfer lines are not located at the expected position.

7. The applicator tool of claim 6, wherein the vision system includes at least one illumination element configured to direct light energy onto the exterior surface of the wind turbine blade such that the at least one imaging device is configured to image the exterior surface of the wind turbine blade when illuminated by the at least one illumination element.

8. The applicator tool of claim 6, wherein the expected position is located at the two specific engagement locations where the first and second chamfer arms engage the outer surface of the spatula during operation of the robotic maintenance device.

9. The applicator tool of claim 6, wherein when the first and second chamfer lines are not located at the expected position, the controller is more specifically programmed to:

send a signal to the drive element to increase the supply rate of the coating material to the first nozzle, if the first and second chamfer lines are positioned closer to the leading edge than the expected position, indicative of an underfill condition; and send a signal to the drive element to decrease the supply rate of the coating material to the first nozzle, if the first and second chamfer lines are positioned farther from the leading edge than the expected position, indicative of an overfill condition.

10. The applicator tool of claim 7, wherein the coating material includes an ultraviolet material additive, and the at least one illumination element is configured to direct ultraviolet light energy onto the exterior surface of the wind turbine blade, such that the vision system detects where the coating terminates based on where the ultraviolet material additive stops when illuminated by the ultraviolet light energy.

11. The applicator tool of claim 7, wherein the at least one illumination element is configured to direct visible spectrum light energy onto the exterior surface of the wind turbine blade, such that the vision system detects where the coating terminates based on a change in reflectivity and/or color observed when illuminated by the visible spectrum light energy.

12. The applicator tool according to claim 1, further comprising:

a second nozzle adjacent the first nozzle and including a nozzle outlet located under the spatula to deliver coating material into the gap as the robotic maintenance device moves the spatula along the leading edge of the wind turbine blade, characterized in that the first and second nozzles are configured for independent connection to respective first and second coating material supply containers, such that the applicator tool applies coating material from the first nozzle until the first coating material supply container is about to be exhausted, at which point the applicator tool begins applying coating material from the second nozzle to thereby maintain a consistent supply rate of the coating material to the spatula.

13. The applicator tool of claim 12, wherein the applicator tool includes at least three nozzles and the robotic maintenance device includes a coating material supply container for each nozzle, said coating material supply containers independently connected to a respective one of said at least three nozzles to increase a total amount of coating material applied and/or a total length of the leading edge of the wind turbine blade that can be repaired by the robotic maintenance device.

14. The applicator tool of claim 12, wherein each of the coating material supply containers is configured to be supported in a shared revolver or storage rack located on a main chassis of the robotic maintenance device, and separate feed hoses are connected between each nozzle at the applicator tool and a corresponding one of the coating material supply containers.

15. The applicator tool of claim 12, wherein the nozzle outlets of each of the nozzles are arranged in side-by-side relationship under the spatula to feed coating material into the gap.

16. The applicator tool of claim 1, further comprising:

a repair verification scanner including a first scanning element and a second scanning element, each of which is configured to detect a profile height of the leading edge of the wind turbine blade defined by a spacing between the leading edge and the corresponding first or second scanning element, the first scanning element being positioned upstream from the spatula to scan the leading edge before the shaped coating is applied, and the second scanning element is positioned downstream from the spatula to scan the leading edge after the shaped coating is applied, thereby to determine a coating layer thickness of the shaped coating applied to the wind turbine blade, the coating layer thickness being a difference between the spacings detected by the first and second scanning elements.

17. The applicator tool of claim 16, wherein the first and second scanning elements each includes an infrared sensor.

18. The applicator tool of claim 16, wherein the first and second scanning elements perform continuous line scans of the profile height of the leading edge such that the coating layer thickness is detected over an entire working length where the applicator tool applies the shaped coating to repair damages on the wind turbine blade.

19. A robotic maintenance device for repairing damage around a leading edge of a wind turbine blade on a wind turbine, the maintenance device comprising:

the applicator tool of claim 1; and a sander configured to sand the exterior surface around the leading edge of the wind turbine blade at the damage before the coating material is applied, and characterized in that the first and second chamfer arms are adjusted to position the first and second chamfer lines of the shaped coating proximate edges of where the exterior surface has been sanded.

20. A method for repairing damage around a leading edge of a wind turbine blade on a wind turbine, the method comprising:

providing a robotic maintenance device onto the wind turbine blade, the robotic maintenance device including the applicator tool according to claim 1 operatively connected thereto;

moving the robotic maintenance device along a working length at the leading edge of the wind turbine blade;

discharging a coating material from the first nozzle under the spatula and specifically into a gap defined between an extrusion plate of the spatula and an exterior surface of the wind turbine blade;

shaping the coating material into a shaped coating with the extrusion plate of the spatula as the coating material spreads in the gap and as the spatula moves along the working length, the shaped coating filling in and covering the damage on the wind turbine blade; and engaging the first and second chamfer arms with a drive cylinder to press the extrusion plate against the exterior surface of the wind turbine blade at two specific engagement locations on opposing sides of the leading edge of the wind turbine blade, thereby limiting spread of the coating material beyond the two specific engagement locations such that the shaped coating applied to the wind turbine blade extends between a first chamfer line and a second chamfer line on opposite sides of the leading edge.

21. The method of claim 20, wherein the applicator tool further includes a vision system including at least one imaging device, and the method further comprises:

imaging the exterior surface of the wind turbine blade following repair actions performed by the applicator tool with the at least one imaging device;

detecting, based on images from the at least one imaging device, a specific location along the exterior surface where the coating material terminates to define the first and second chamfer lines;

comparing the specific location of the first and second chamfer lines to an expected position defined by a desired size of the shaped coating; and varying a supply rate of the coating material to the nozzle when the first and second chamfer lines are not located at the expected position, to thereby change the specific location of the first and second chamfer lines to correct for any underfill or overfill condition at the shaped coating.

22. The method of claim 20, wherein the applicator tool includes at least two nozzles and the robotic maintenance device further includes a coating material supply container for each nozzle, said coating material supply containers independently connected to a respective one of said at least two nozzles, and the method further comprises:

applying coating material through the first nozzle from the first coating material supply container until the first coating material supply container is about to be exhausted; and thereafter applying coating material through another of the at least two nozzles from the respective coating material supply containers to continue discharging the coating material under the spatula and into the gap at a consistent supply rate.

23. The method of claim 20, wherein the applicator tool further includes a repair verification scanner including a first scanning element and a second scanning element, and the method further comprising:

scanning the leading edge of the wind turbine blade with the first scanning element before repair actions are performed by the applicator tool, thereby detecting a profile height of the leading edge defined by a spacing between the leading edge and the first scanning element;

scanning the leading edge of the wind turbine blade with the second scanning element after repair actions are performed by the applicator tool, thereby detecting a profile height of the leading edge defined by a spacing between the leading edge and the second scanning element; and determining a coating layer thickness of the shaped coating applied to the wind turbine blade, the coating layer thickness being a difference between the spacings detected by the first and second scanning elements.

24. The applicator tool of claim 1, further comprising a first support arm and a second support arm operatively coupled to the tool frame, and each engaging the outer surface of the extrusion plate of the spatula adjacent the opposed side edges to press the extrusion plate against the exterior surface of the wind turbine blade at two support engagement locations on opposing sides of the leading edge of the wind turbine blade, wherein the two engagement locations of the first and second chamfer arms are located between the central axis and the two support engagement locations of the first and second support arms, respectively.

* * * * *